United States Patent
Nader et al.

(10) Patent No.: US 7,342,897 B1
(45) Date of Patent: Mar. 11, 2008

(54) NETWORK VERIFICATION TOOL

(75) Inventors: Babak Nader, Danville, CA (US);
Biren Fondekar, Fremont, CA (US);
Christopher Cook, Aptos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/370,724

(22) Filed: Aug. 7, 1999

(51) Int. Cl.
*H04L 12/26* (2006.01)
*G06F 9/30* (2006.01)

(52) U.S. Cl. .............. 370/255; 370/241; 370/401; 709/203

(58) Field of Classification Search ........ 370/216–228, 370/241, 241.1, 253–255, 257–258, 400–401; 712/227; 709/203
See application file for complete search history.

(56) References Cited

U.S. PATENT DOCUMENTS

| | | | |
|---|---|---|---|
| 4,951,278 A * | 8/1990 | Biber et al. ................. 370/474 |
| 5,715,387 A * | 2/1998 | Barnstijn et al. ............. 714/38 |
| 5,793,954 A * | 8/1998 | Baker et al. ................ 709/250 |
| 5,812,529 A * | 9/1998 | Czarnik et al. ............. 370/245 |
| 5,838,968 A * | 11/1998 | Culbert ...................... 718/104 |
| 5,850,388 A * | 12/1998 | Anderson et al. ........... 370/252 |
| 5,854,889 A * | 12/1998 | Liese et al. .................. 714/43 |
| 5,897,609 A * | 4/1999 | Choi et al. .................. 702/122 |
| 5,987,633 A * | 11/1999 | Newman et al. ............. 714/712 |
| 6,003,030 A * | 12/1999 | Kenner et al. ................. 707/10 |
| 6,069,873 A * | 5/2000 | Pugaczewski et al. ...... 370/241 |
| 6,189,031 B1 * | 2/2001 | Badger et al. .............. 709/224 |
| 6,269,330 B1 * | 7/2001 | Cidon et al. .................. 714/43 |
| 6,295,518 B1 * | 9/2001 | McLain et al. ............... 703/23 |
| 6,385,615 B1 * | 5/2002 | Haeri et al. .................. 707/10 |
| 6,397,359 B1 * | 5/2002 | Chandra et al. ............ 714/712 |
| 6,425,096 B1 * | 7/2002 | Liese et al. .................. 714/43 |
| 6,618,854 B1 * | 9/2003 | Mann ......................... 717/124 |
| 6,674,724 B1 * | 1/2004 | Main et al. ................. 370/241 |
| 6,711,137 B1 * | 3/2004 | Klassen et al. ............. 370/252 |
| 6,819,655 B1 * | 11/2004 | Gregson ..................... 370/242 |
| 6,891,803 B1 * | 5/2005 | Chang et al. ............... 370/252 |

* cited by examiner

*Primary Examiner*—Chi Pham
*Assistant Examiner*—Ahmed Elallam
(74) *Attorney, Agent, or Firm*—Campbell Stephenson LLP

(57) ABSTRACT

A network verification tool is presented that allows a user to easily create tasks for a collection of task types. The collection of task types are hosted by probe network devices that are coupled to a network under test. The network under test includes network devices executing generic network software and particular hardware or software that is being tested. The probe network devices are coupled to an NVT server, which transmits tasks to the task types and interfaces with one or more NVT clients. The NVT clients can create tasks by entering the appropriate parameters within templates supplied by the NVT server. Any collection of task types can be included in the network verification tool, including traffic generators, traffic analyzers, large network emulators, session emulators, device queries and script tasks.

21 Claims, 17 Drawing Sheets

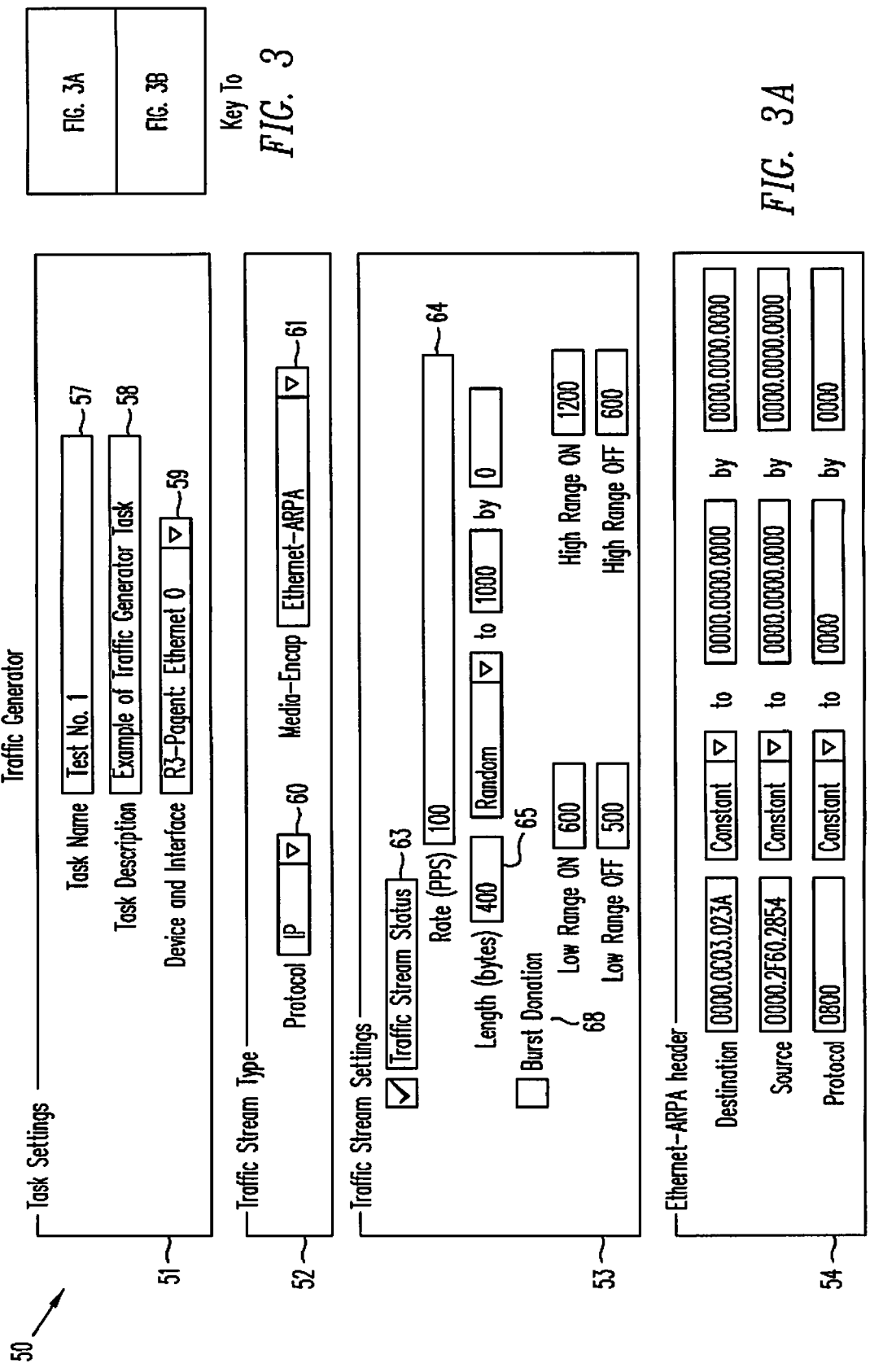

420

EIG. Large Network Emulator

Task Settings — 401
- Task Name — 402
- Task Description — 403
- Device [PagentA-console ▽] — 404

Traffic Stream Settings — 405
- ☐ Traffic Stream Status — 406
- ☐ Flap Duration — 407
- Low Range ON [600]
- Low Range OFF [300]
- 408
- High Range ON [1200]
- High Range OFF [600]

IP-EIGRP Settings — 421
- Source [0.0.0.0] — 423
- Local AS [100] — 424
- Networks to Advertise [5] — 425

EIGRP Network Settings — 422
- Addresses Per TLV [5] — 426
- Network Start Address [0.0.0.0] — 427
- Network Subnet Mask [0.0.0.0] — 428
- Low Hop Count [2] — 429
- Low Delay Per Hop [50] — 430
- Low Bandwidth [50] — 431
- Low MTU [500] — 432
- Low Reliability [1] — 433
- Low Load [1] — 434
- High Hop Count [7] — 435
- High Delay Per Hop [200] — 436
- High Bandwidth [2000] — 437
- High MTU [10000] — 438
- High Reliability [200] — 439
- High Load [200] — 440

Exterior EIGRP Settings — 441
- Router ID [1.1.1.1] — 442
- Remote AS [101] — 443
- Admin Tag [0] — 444
- External Protocol [0] — 445
- External Protocol Metric [0] — 446
- Flag Value [0] — 447

*FIG. 6B*

OSPF Large Network Emulator

Task Settings — 401
- Task Name — 402
- Task Description — 403
- Device [PagentB-console ▽] — 404

Traffic Settings
- ☐ Traffic Stream Status — 406
- ☐ Flap Duration — 407
- 405
- Low Range ON [600]
- Low Range OFF [300]
- 408
- High Range ON [1200]
- High Range OFF [600]

IP Settings — 476
- Source [0.0.0.0] — 477

OSPF Settings — 478
- Router ID [1.1.1.1] — 479
- Area [0.0.0.0] — 480
- Network [101] — 481
- Stub Networks [5] — 482
- Clusters [2] — 483
- Rows Per Cluster [2] — 484    Columns Per Cluster [7] — 485
- 486
- ☐ Summary Links
  - Number of Links [100 ▽] — 487    Router Index [5 ▽] — 488
  - Network Start [0.0.0.0 ▽] — 489    Subnet Mask [0.0.0.0 ▽] — 490
- ☐ External Links — 491
  - Number of Links [100 ▽] — 492    Router Index [2 ▽] — 493
  - Network Start [0.0.0.0 ▽] — 494    Subnet Mask [0.0.0.0 ▽] — 495

Task Settings

801

Task Name [        ]—803
Task Description [        ]—804
Device [R6-7507 ▽]—805

Query Settings

802

Times to Query [1]—806
Delay between Queries [1]—807

☐ Save results to —808      Filename [filename.dat]—809

*FIG. 8A*

Status Information

☐ Neighbors —811         ☐ Summary —820
☐ CIDR —812              ☐ Inconsistent AS —821
☐ Path —813              ☐ Dampened Paths —822
☐ Peer Groups —814       ☐ Flap Statistics —823

☐ Network —815           [0.0.0.0]—824
☐ Community Number —816  [0]—825
☐ Community List —817    [0]—826
☐ Filter List —818       [0]—827
☐ Regular Expression —819 [0]—828

*FIG. 8B*   810

Status Information

☐ Neighbors —830    ☐ Interface —832
☐ Traffic —831      ☐ Topology —833

*FIG. 8C*   829

NETWORK VERIFICATION TOOL

BACKGROUND

1. Field of the Invention

This invention relates to test technology for testing computer networks, and, more particularly, relates to a network verification tool for testing network software, hardware or network design in a controlled, realistic networking environment.

2. Discussion of Related Art

Networks are extensively tested in order to evaluate networks (e.g., hardware, software or network designs) before deploying the proposed network design. Most network users need to evaluate new hardware and software before the hardware or software is implemented in the networking environment. Preferably, acceptance tests of new hardware and software are desirable before that hardware and software is purchased for use in a particular networking environment. One particular difficulty for most network operators is that they do not have the ability to create a consolidated view of their production networks in a testing environment that yields performance results indicative of the behavior of the tested portion of the environment in actual use. Testing new hardware, software or network designs on a production network itself is often prohibitively disruptive.

Although many test tools (e.g., traffic generators, traffic analyzers, large network emulators, session emulators and the like) are known, they are complex, have a steep learning curve, and are not consolidated under a single framework. They are, therefore, cumbersome to use and do not easily cooperate with one another to create a consistent testing environment. A network administrator's ability to adequately test software, hardware or network designs is therefore complicated by difficulties in integrating multiple independent test packages into one realistic testing environment.

Therefore, there is a need for a comprehensive and easy to use test tool that consolidates the various network tests within a single versatile framework, allows network users to easily evaluate hardware, software and network design in a lab network environment that closely approximates their own production environment, and allows repeatable testing of software, hardware and network configurations.

SUMMARY

According to the present invention, a network verification tool is presented. The network verification tool (NVT) allows a user to test hardware, software or network design configurations by emulating a production network in a controlled laboratory environment. Additionally, in most embodiments, the NVT is a web-based application that provides a graphical user interface (GUI) to control and monitor a collection of individual test tools. In most embodiments, NVT emulates a production network by generating multi-protocol network traffic, routing topologies and client/server data traffic on the lab network.

Embodiments of the NVT provide an interface between a test user and a collection of test tools, or task types. A task is an individual invocation of a task type, having specific parameters that are set by the user. An NVT may allow production of profiles, which are aggregations of individual tasks. Profiles can be used to replicate the complexity of production networks within a test lab and to provide controlled testing within that networking environment. The NVT user interface can be any interface, including a Java or HTML based web enabled framework.

In most embodiments of the NVT, a GUI front end preprocessor generates code in response to parameters inputted by a user. In most embodiments, each task type is associated with a task template that allows the user to easily set parameters required for performance of particular tasks. The NVT server transmits instructions to the probe network devices, which then execute processes using the task type software resident on the probe network device. In addition to individual tasks, profiles can be created. A profile is a collection of tasks that contain configuration information, traffic and protocol information, and other data which can then be exchanged between the user and a vendor in order to facilitate joint resolution of networking problems.

A user creates and monitors network tests to be run on a test network through a series of task templates. The NVT server is coupled to the test network. In some embodiments, the NVT server is coupled through an Ethernet connection, although any method of coupling can be used. The test network includes a collection of probe network devices coupled to the NVT server. The probe network devices each include software to run one or more of the available task types. Various task types include traffic generators, traffic analyzers, session emulators, large network emulators, script tasks and device queries. The NVT server receives the tasks, i.e. task parameters, included in a particular test either through a profile or by an NVT client sending each task individually. The NVT server then translates the tasks to control language and sends instructions to individual host network devices. Host network devices then run processes corresponding to the appropriate task types on the probe network devices. The probe network devices are coupled to a network under test, which includes a collection of routers, bridges, switches or other network components operating conventional networking software. The network under test also includes particular hardware, software or network designs that are currently being tested. A network device can be any device in the network.

Through the processes run on the individual probe network devices, the network under test is made to behave as if it were part of a much large network, thus emulating the larger network. Additionally, problematic packets can be injected into the network under test and the response of the network under test can be monitored. This method, known typically as "negative testing" can be performed with embodiments of the invention.

These embodiments, as well as others, are further discussed below along with the following figures.

SHORT DESCRIPTION OF THE FIGURES

FIG. 6B shows an example of an EIGRP large network emulator task template.

FIG. 6E shows an example of an OSPF large network emulator task template.

FIG. 8A shows a portion of a device query task template, which is appropriate for CPU, Memory and IP routes device query tasks.

FIG. 8B shows a status information portion of a query BGP task template.

FIG. 8C shows a status information portion of a query EIGRP task template.

Figure 1:
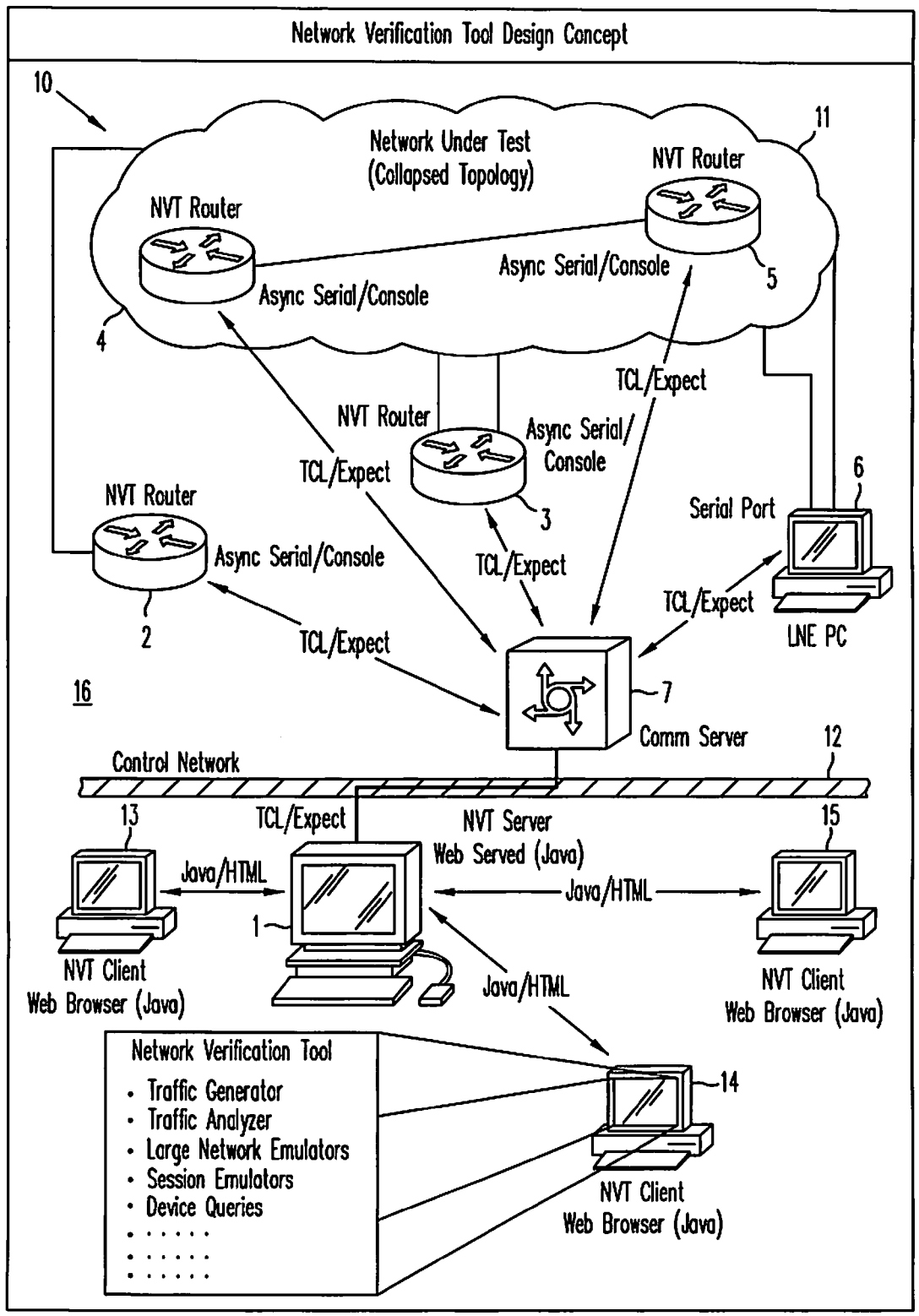
FIG. 1 shows a block diagram of an NVT environment, including a test network and NVT server, according to the present invention.

Elements having similar or identical functions in the figures are identically labeled. Each of the figures is more fully described below.

DETAILED DESCRIPTION

Definitions

For clarity, a summary of the terms used to describe embodiments of the invention are given below.

| | |
|---|---|
| Client or User | A Client or User refers to the person using the NVT. The Client is coupled to the NVT server either by using the NVT server directly or through a network. |
| Device Queries | A Device Query is a task type that retrieves and displays information from a network device. |
| Large Network Emulator | A large network emulator is a task type that fills routing tables by emulating a network device with access to a large network. |
| Network Device | A network device is any device on the network, including routers, bridges, switches, and computers. |
| Network under test (Lab Network) | The network under test or lab network is the collection of coupled network devices operating conventional software and including the particular software, hardware or network design that is being tested. The network under test is coupled to the probe network devices, which emulate a large network, probe and monitor the network under test. |
| NVT | Network Verification Tool. Refers to the comprehensive and easy to use test tool suite that consolidates various network testing software (i.e., task types) within a single versatile framework. |
| NVT server | The NVT server receives task parameters, usually by the client entering the parameters into templates, and transmits the corresponding instructions to probe network devices in order to execute the associated task types. |
| Probe Network Device | A network device that hosts task type software. Probe network devices can be any network device, including routers, bridges, switches, and computers. Probe network devices are coupled to a network under test and perform processes that emulate a larger network environment and test the response of the network under test. |
| Process | The execution of a task type on a probe network device. Task types are executed by the probe network device in response to task instructions received from the NVT server. |
| Production Network | A production network refers to a network system running client production applications, i.e. without probe network devices attached. |
| Profile | A profile is a compilation of tasks that are compiled and executed as a group. |
| Script Task | A script task is a task type that allows the client to create customized tasks. Usually, the script task is written by the client in code, for example TCL code, which is decoded by the NVT server. In response to the task type code, the NVT server sends instructions to one or more probe network devices in order to perform the task. |
| Session emulator | A session emulator (either a multi-protocol or single protocol emulator) is a task type that generates verified data traffic in order to test network devices by emulating a busy network environment. |
| Task | A task is an individual invocation of a task type. A task includes all of the parameters required for the task type to be executed on the probe network device. Instructions for performing the task are transmitted to the task type software on the probe network device that will execute the task by the NVT server. |
| Task Type | A task type refers to task software. Task types include traffic generators, traffic analyzers, session emulators, large network emulators, script tasks and device queries. Task types are hosted on individual host network devices. The probe network devices executes the task type software in accordance with the instructions representing a task received from the NVT server to perform a process. |
| Traffic analyzer | A traffic analyzer is a task type that monitors, records and decodes network packets. |
| Traffic Generator | A traffic generator is a task type that generates multi-protocol traffic streams and raw packet streams in order to emulate a large number of network stations, create stressful levels of network traffic, or generate problem packets for transmission through the network under test. |

The NVT Testing Environment

FIG. 1 shows a network verification test (NVT) environment 16 according to the present invention. NVT environment 16 includes a test network 10 and an NVT server 1. Test network 10 includes a network under test 11, at least one probe network device, and a communication server 7. Although test network 10 can include any number of probe network devices, probe network devices 2 through 6 are shown in FIG. 1. Probe network device 6 is shown as an individual computer capable of operating as a large network emulator. Network under test 11 can be any configuration of network devices executing generic software and the software, hardware and network design being tested and end-user computer systems. Network under test 11 also includes particular hardware or software that is being tested. The network devices of network under test 11 operate as if they are members of a much larger network, as emulated by probe network devices 2 through 6.

Probe network devices 2 through 6 are coupled into network under test 11 and, depending on the test, operate various processes from task types which they host in order to emulate a larger network environment or to probe conditions of a larger network environment.

Communication server 7 couples probe network devices 2 through 6 to a control network 12, which can be any communications network including Ethernet, Token Ring, or FDDI. An NVT server 1 is also coupled to control network 12 and therefore communicates through communication server 7 to network devices 2 through 6. NVT server 1 is coupled, for example through the Internet, with any number of NVT clients, of which clients 13, 14 and 15 are shown in FIG. 1. Alternatively, NVT server 1 can be utilized by a user to operate NVT testing environment 16. NVT clients 13, 14 and 15 communicate with NVT server 1 through, for example, web enabled Java/HTML based communications.

In most embodiments of the invention, each of NVT probe network devices, i.e., network devices 2 through 6, are preloaded with task types (i.e. task software). In some embodiments, task types may be loaded into network devices 2 through 6 by NVT server 1 prior to testing or during download of individual tasks. A task is an a particular embodiment of a task type and includes particular values for each of the parameters required to execute that task type. A task usually is executed using task type software of a particular probe network device, although in some cases (for example with script tasks) a task can be executed using task type software resident on multiple probe network devices.

The task types that can be loaded into each of network devices 2 through 6 include traffic generators, traffic analyzers, session emulators, large network emulators, script tasks and device queries. Other network monitoring, emulation, and testing task types may also be loaded into probe network devices 2 through 6. Each of probe network devices 2 through 6 is loaded with at least one task type in order to be capable of performing at least one task. In most embodiments, each probe network device is pre-loaded with multiple task types that, when presented with parameters in a task, provide and execute test processes.

Each task type begins operation according to a task that is communicated to the network device on which that task type resides. The same task type may be hosted by several network devices. The individual task is the particular set of parameters required for that task type to operate. The task type, when executing a task, is referred to as a process.

Figure 2:
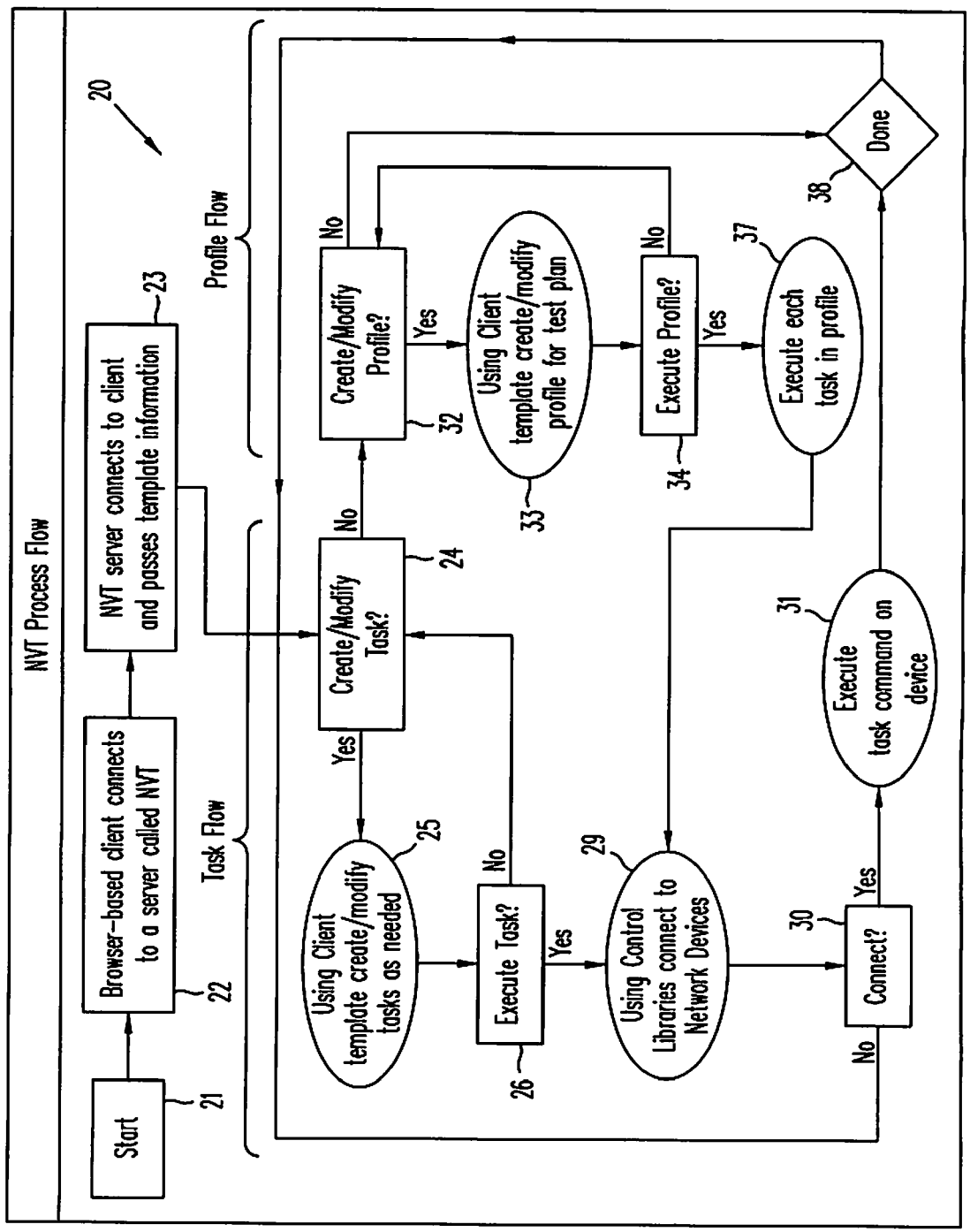
FIG. 2 shows a process flow diagram for implementation of a network verification tool according to the present invention.

A profile is a collection of tasks. NVT server 1 can run a profile by sending each task to the associated task type hosted on network devices 2 through 6. FIG. 2 shows process flow 20 for setting up and initiating a typical network verification test. The client referred to in FIG. 2 could be any client coupled to NVT server 1, but for simplicity the client will be considered to be client 14 in the following discussion.

Process flow 20 starts at start step 21. In step 22, client 14 (FIG. 1) connects with NVT server 1 (FIG. 1) through, for example, the Internet. Alternatively, an NVT test can be configured and executed directly from NVT server 1. In step 23, NVT server 1 connects to client 14 and sends a collection of templates to client 14. The collection of templates includes a template for each task type hosted by the probe network devices (e.g., network devices 2 through 6 of FIG. 1) to which tasks can be assigned. In some embodiments, client 14 already has the collection of templates. Therefore, NVT server 1 need not send all of the templates, but may be required to send a subset of the collection of templates. Individual templates may be transmitted at the request of client 14. Optionally, the collection of templates may be updated only if they have been modified in the NVT test system. Each task type is associated with a template through which client 14 can create an individual task by entering the requested parameters into the template. Templates for selected task types are further discussed below. In most embodiments, NVT client 14 is coupled to NVT server 1 through an Internet connection and templates are communicated, for example, via HTML or JAVA.

In most embodiments of the invention, NVT process 20 is menu driven. In step 24, NVT client 14 has the option (by pull down menu or action button) to create a new task or open and modify an already created task. If NVT client 14 elects to create or modify a task, then step 25 is executed. If NVT client 14 decides not to create or modify a task, then process 20 proceeds to step 32.

In step 25, NVT client 14 uses task templates, which can be accessed usually through pull down menus or action buttons, to create a new task or modify an already existing task. Existing tasks can be stored at NVT client 14 or, alternatively, can be stored at NVT server 1 and downloaded to NVT client 14 upon request. In addition, NVT server 1 may store a library of tasks from which NVT client 14 may create other tasks. In step 25, tasks may be stored, deleted and modified. In most embodiments, the parameters entered into a task template to create a task are checked for self-consistency and client 14 is alerted to inconsistent parameters before the task is saved or executed. Additionally, individual tasks may be deleted from storage in step 25.

Once a task has been created or modified in step 25 (or simply after it has been opened), NVT client 14 has the option of executing the task in step 26. If NVT client 14 decides to execute the task, then in step 29 the task is downloaded to NVT server 1 (FIG. 1). NVT server 1 (FIG. 1), using control libraries, translates from the parameters in the task (as entered into the task template) to instructions that can be sent to and executed by the task type software resident on the probe network devices. (i.e., network devices 2 through 6 of FIG. 1). In step 30, NVT server 1 connects through control network 12 and communication server 7 to the network device (network device 2 through 6, for example) which hosts the task type to which the template is connected. The task is started (i.e., begins to run on the network device to which it is assigned) in step 31. If no connection is made in step 30, then process 20 returns to step 24, where the task can be reviewed by client 14. When the task is being executed, it is referred to as a process.

Client 14 can create multiple tasks and have processes associated with the tasks operating on test network 10 immediately. This ability can be important for device query tasks and for halting processes that have already begun. The ability also provides a user versatility in monitoring test network 10 while a particular test is being performed.

In step 32, NVT client 14 can open existing profiles, create new profiles or modify existing profiles. A profile is a collection of tasks that are executed together. If NVT client 14 wishes to create or modify a profile in step 33, the modifications are made on a template as was transferred to NVT client 14 in initial step 23. Existing profiles may also be saved or deleted in step 33. Further profiles may be modified or process 20 may finish at step 38. Profiles may be saved at NVT client 14 or, alternatively, at NVT server 1.

Additionally, NVT server 1 may include libraries of pre-created profiles that may be used or altered by NVT client 14.

In step 34, NVT client 14 can execute a profile. If NVT client 14 decides not to execute the profile at this time, then more profiles can be modified or created in step 32. If NVT client 14 executes the profile, in step 37, each task in the profile is executed in steps 29, 30 and 31. After the profile is executed, the process halts at step 38. From step 38, NVT client 14 may return to step 24 in order to modify or create new tasks and profiles.

Task Types and Tasks

The following section describes some of the task types and associated task parameters that are involved in the network testing. The task types described below include traffic generators, traffic analyzers, large network emulators, session emulators and device queries. Each of these task types, if it exists in the NVT system, resides on at least one of the probe network devices in the system, e.g. network devices 2 through 6 in FIG. 1. The task probe network devices receive tasks assigned to a task type hosted on the probe network device and starts a process from that task type with the parameters from the task. The probe network devices receive tasks through Ethernet control network 12 from NVT server 1, for example, through a telnet connection to NVT server 1.

A test using NVT according to the present invention can include any number of probe network devices (network devices 2 through 6 of FIG. 1) and may test a network under test 11 (FIG. 1) of any size. Additionally, the collection of task types that are loaded into probe network devices (network devices 2 through 6 of FIG. 1) of test network 10 can be any testing and monitoring software. Those explicitly discussed here are the most common network emulation, testing and monitoring task types and are in no way exhaustive of all task types that may be included. NVT server 1 (FIG. 1) is capable of interpreting tasks for each task type and assigning, with or without user direction, the appropriate task to the appropriate task type on one of the probe network devices. As was discussed above, parameters for each task are inputted by a user at, for example, client 14, with the use of templates. The tasks are then translated by NVT server 1 into instructions that are executable by the task types on the host probe network devices and are transmitted to the host probe network devices for execution. Then the process is started from each task type with the particular task on the individual network device.

Traffic Generator

A traffic generator task type is used to create and send user-defined traffic streams in any combination of supported protocol and media encapsulation. Traffic generators can emulate a large number of network stations, create stressful levels of network traffic, generate specific packets to test a network device or bridge feature that is under test, or duplicate packets that cause problems for the network under test. The number of traffic streams that can be created by an individual traffic generator task type is limited only by the available memory in the host probe network device. Communications packets generated by a traffic generator task type can be transmitted at a continuous rate or in bursts. The duration of the bursts and the delay between bursts can be defined to be constant or can be random values within a chosen range.

Figure 3B:
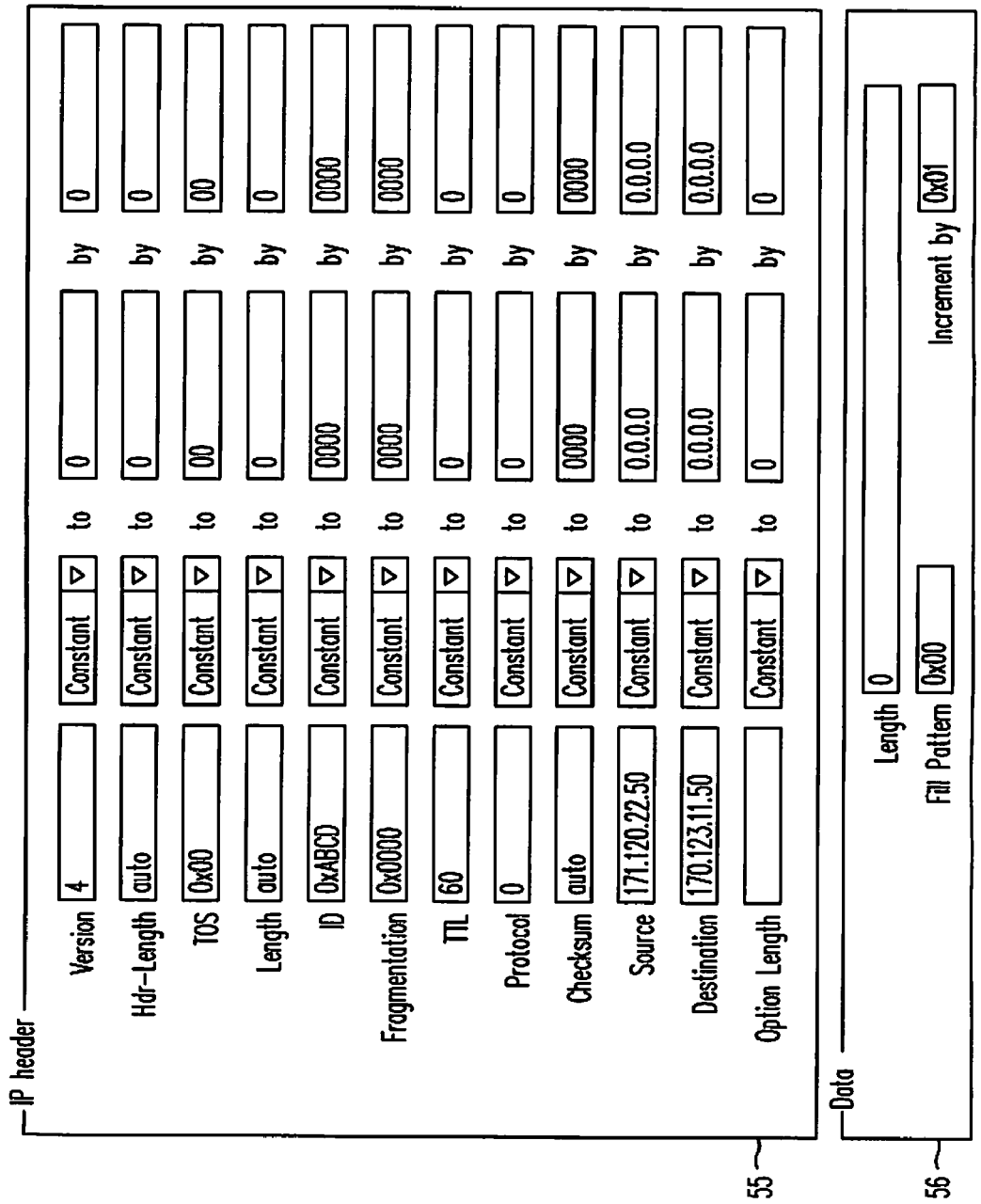
FIG. 3 shows an example of a traffic generator task template.

FIG. 3 shows an example of a traffic generator template 50, which a user (operating NVT client 14, for example) can utilize to create a traffic generator task. Template 50 includes a task settings portion 51, a traffic stream type portion 52, a traffic stream settings portion 53, a media-encapsulation header portion 54, protocol header portion 55 and a data portion 56. Task settings portion 51 involves identifying a user defined task name 57. In most embodiments, the user can also input a task description in a task description field 58. Finally, the device (i.e., the probe network device) and interface on which the particular task type will run the task is chosen in pull-down menu 59. Pull down menu 59 lists all of the network devices hosting a particular task type and interfaces on the network device on which the task being defined by template 50 can be run.

Traffic stream type portion 52 includes a protocol pull down 60 and a media-encap pull down 61. A user can then select in protocol pull down 60 a particular protocol and in media encap pull down 61 a particular medium and encapsulation combination. Any protocol can be represented in protocol pull down 60, including IP, IPX, CLNS, Decnet, XNS, AppleTalk, Vines, TCP, UDP, ICMP, and IGMP. Additionally, any media and encapsulation combination can be represented in media-encap pull down 61. Examples of media include Ethernet, FDDI, Serial and Token Ring; examples of encapsulation include ARPA, SNAP, SAP, Novell-Ether and HDLC. In most embodiments, only certain combinations of protocol and media encapsulation can be supported. The parameters and conventions inherent in each of these protocols, media and encapsulations are well known in the art. For a review of these protocols, media and encapsulations general, see, e.g. M. FORD ET AL., INTERNETWORKING TECHNOLOGIES HANDBOOK (1997). Table 1 shows the available combinations of protocol and media-encapsulation for one embodiment of the invention.

Selecting the traffic stream settings in traffic stream settings portion 53 involves four major steps: activating the traffic stream, selecting the packet rate, selecting the length of the packets and controlling the burst mode. The traffic stream status box 63, which is defaulted to active, indicates whether the traffic stream is active or inactive. If deactivated, then the task will not generate packets and all traffic streams on the indicated interface are stopped. An operating process, then, can be terminated by modifying the associated task to deactivate the traffic stream and, in steps 29, 30 and 31 of FIG. 2, executing the modified task.

The rate field 64 is used to control the rate at which packets are sent. In most embodiments, the default rate is 100 packets per second (PPS). The only upper limit on the rate is the speed of the host network device (e.g., one of network devices 2 through 6) and the rate of transmission over test network 10 (FIG. 1).

Parameters entered into a length field 65 determine the length of the packet. In most embodiments, length is measured in bytes. In most embodiments, the length is set to include all headers (which depend on the protocol and media-encapsulation parameter) and the data array. Some embodiments have an "auto" setting that automatically sets the packet length to an appropriate length. Some embodiments, the user can set a constant or random length. The data length can be set to any length, even if it is less than the data array or less than the headers. If the length is set at a value greater than that of the headers and the data array, then a fill pattern is used to define the additionally required bytes in the packet. Additionally, the length can be set to yield a random packet length falling within a particular range. Additionally, the random length can be set to increase by a minimum length plus multiples of an increment. The range is set using the "to" field and the "by" field of length field 65.

Burst duration fields 68 control whether packets are continuously sent or whether packets are sent in bursts. If burst transmission is set, i.e. by turning the burst duration on, the packets are sent in specified burst intervals. The low and high range on values, which set the duration of bursts, and the low and high range off, which set the length of time between bursts, are separately input to template 50. For example, in one embodiment if the low range on is set to 5000 and the high range on is set to 5000, then the traffic generator sends bursts of 5 second duration. If the low range off is set at 60000 and the high range off is set to 20000, then there is a random delay of between 60 to 200 seconds between bursts. Other embodiments may use different time measurement standards.

Media-encapsulation header fields 54 and protocol header fields 55 are dependent on the particular media-encapsulation and protocol that is set in traffic stream portion 52. In general, packet header portions (portions 54 and 55) refer to and control either the data link, the network, or the transport layer of test network 10. Most header fields support decimal, hex, MAC address or IP address field data. These parameters can all be defined as having a Constant value, Incrementing value over a range, or Random value over a range. Generally, each field includes a value field, a pull-down menu, a "to" field, and a "by" field. For example, in portion 54 the destination field includes a value field, a pull-down menu, a "to" field and a "by" field.

Some fields only support strings of hex numbers. These fields cannot be Incrementing or Random. In order to provide variability, in some embodiments a Script task can be used to lay a configurable field over those fields. The relevant fields include the Token Ring RIF (routing information field), CLNS source and destination areas, IP option field and TCP option field. Other fields, such as checksum or header length fields, can be automatically set to appropriate values. Decimal and Hexadecimal fields can be set to be constant, incremented by 1 or a user-defined value, random by a default value times 1 byte or some user defined value. In most embodiments, header fields that require a MAC address must be entered as full MAC addresses except for the Increment "by" field, which is entered as a maximum 4-byte decimal or hex value. The Increment and Random settings will only affect the last four bytes of the MAC 6-byte fields. In order to set the first two bytes to change, a Script task can overlay a configurable field on top of these bytes.

For example, to set a MAC address field to increment from a minimum (e.g. 0000.000.abcd) to a maximum value (0000.0100.abcd) by a specified value (0x10000), then the value field is set to 0000.0000.abcd, "increment" is selected in the pull-down menu, the "to" field is set to 0000.0100.abcd, and the "by" field is set to 0x10000.

Table 2 below shows the fields included in portion 54 of template 50 for various combinations of media-encapsulation. For an explanation and definition of the particular fields required in each combination of media-encapsulation, See, e.g., M. FORD ET AL., INTERNETWORKING TECHNOLOGIES HANDBOOK (1997). Table 3 shows the fields included in portion 55 of template 50 for particular protocols. For further discussion of the various protocols, see, e.g., M. FORD ET AL., INTERNETWORKING TECHNOLOGIES HANDBOOK (1997). The media-encapsulation parameters and the protocol parameters are well known in the art and, as such, are not discussed in detail in this disclosure.

Data fields 56 in template 50 of FIG. 3 allow input of the fields controlling the data portion of the communication packet that follows the header portion of the packet. The length field sets how much of the data array is used when the packet is created. If the data field is set to 0, the packet consists of media-encapsulation and protocol headers only. If the data field is set to a value greater than 0, the packet consists of media-encapsulation and protocol headers and an additional data portion of that length. If the length field increases the size of the data array, the data length fields (e.g., length field 65 of portion 53) will be updated to reflect the new data array size.

When a packet is created, first the media-encapsulation headers, network protocol headers and transport protocol headers are created and then any data array information is added. If the packet length is longer than the headers and data array, a fill pattern is used to define the remaining bytes of the packet. An initial or start byte and an increment by value usually define the fill pattern. The default start-byte is 0x0 and the default increment is 0x01.

Embodiments of the invention include task templates for any media-encapsulation and network or transport protocol combinations. Any number of such tasks can be created for eventual inclusion into profiles or for immediate execution on the corresponding task type software hosted on probe network devices (network devices 2 through 6 of FIG. 1).

Traffic Analyzers

A traffic analyzer task type is used to monitor, record and decode network packets. Data is recorded in a traffic analyzer buffer in the host probe network device. The traffic analyzer buffer can be set to "one-shot," which stops recording new data when it is full, or "circular," which continually records until the process is stopped. When a circular buffer is full, it overwrites the oldest packets in memory. In some embodiments, a traffic analyzer task type includes filters that allow selective capture, display or fast count of packets. Fast-count is the ability to count and discard packets at higher rates than IOS counters can support. Filters can also be defined to limit the amount of data captured from the network.

A traffic analyzer that is utilized in the present invention can decode multi-protocol headers. Any number of protocol headers can be supported, including AppleTalk, CLNS, Decnet, ICMP, IGMP, IP, IPX, TCP, UDP, VINES and XNS. The number of packets that a traffic analyzer process can capture is limited by how much network device memory in the host network device can be assigned for packet capture and the maximum number of bytes to capture from each packet.

Figure 4:
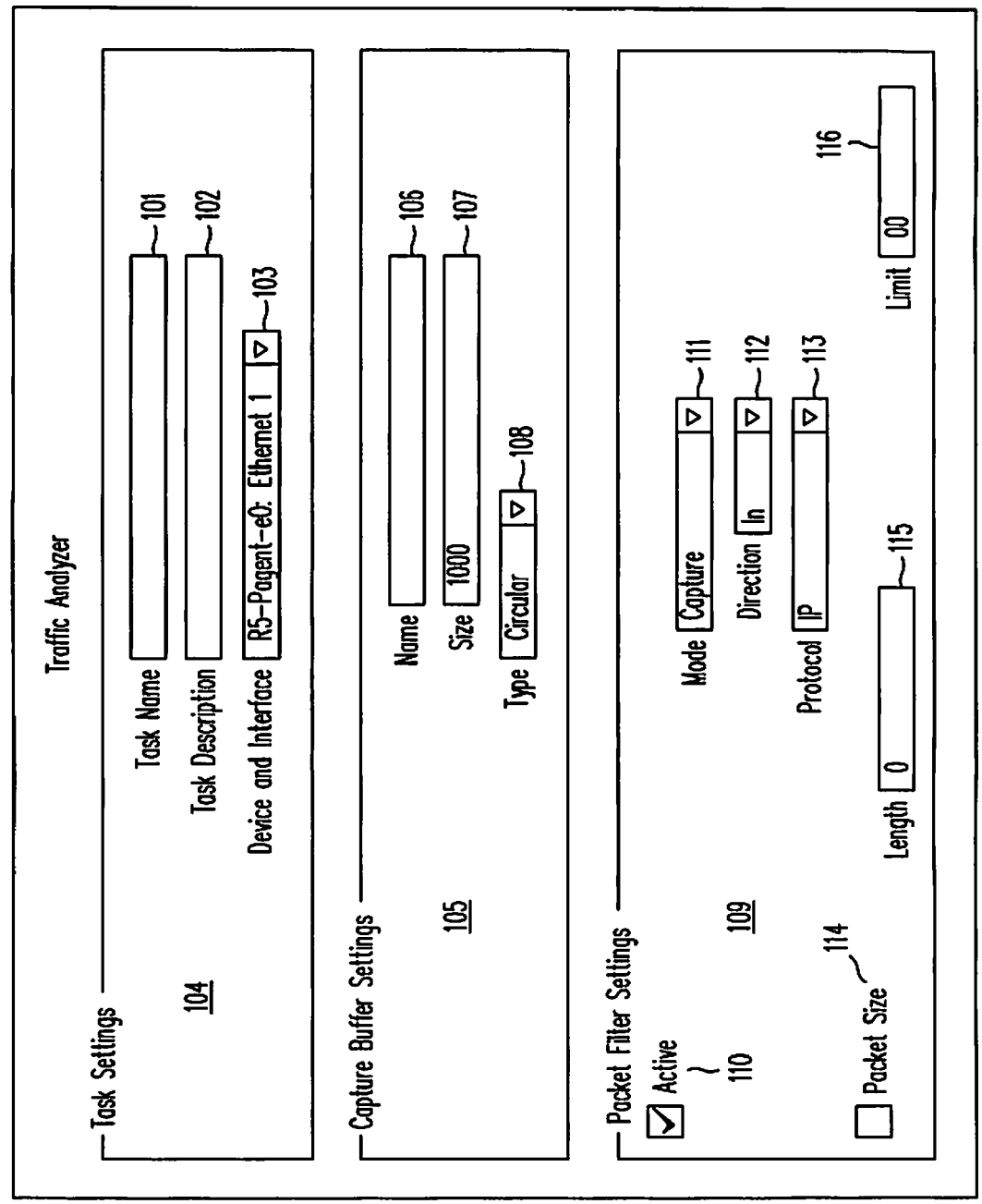
FIG. 4 shows an example of a traffic analyzer task template.

FIG. 4 shows an example traffic analyzer template 100. Template 100 includes a task settings portion 104, a capture buffer settings portion 105, and a packet filter settings portion 109. Task settings portion 104 has a task name field 101 where a user-defined name is entered and a task description field 102 where a description of the task that is being defined is entered. When the task is stored (see step 27 of FIG. 2), it is stored using the name defined in field 101. A device and interface field 103 includes a pull-down menu of all of the probe network devices (see network devices 2 through 6 of FIG. 1) that host a traffic analyzer task type and the interfaces available on the probe network devices. The user chooses a particular host and interface for the task being defined by choosing from the pull-down menu.

Capture buffer settings portion 105 includes fields that define a capture buffer. Defining a capture buffer involves three steps: naming the buffer in name field 106, setting the buffer size in size field 107 and selecting the type of buffer in type field 108. The name field 106 allows for naming a buffer so that, if several capture buffers are utilized, the several capture buffers can be tracked. The size field 107 allows the size of the capture buffer to be determined. The buffer size must be limited so that there is sufficient memory for other capture buffers to be defined in that network device, if any other traffic analyzer tasks are to be assigned to that host, and so that other processes on the network device can operate.

Additionally, type field 108 is a pull-down menu that allows selection of buffer type. Buffer types include a "one-shot" buffer, which stops recording when the capture buffer is filled, and a circular buffer, which continually records by overwriting the oldest packets in the capture buffer until the process is halted. In most embodiments, the capture buffer has two packet counters: Receive Count and Display Count. The Receive Count is the number of packets that have been received by the buffer and the Display Count is the number of packets that can be displayed. For a one-shot type buffer, the two counters are identical and captured packets can be displayed while the task continues to capture further packets. For a circular buffer, when capture is stopped, the number of packets that can be displayed (Display Count) is less than the number of packets received (Receive Count). In most embodiments, a circular buffer can not display packets while continuing to capture packets. If a fast-count filter is elected, then counts will be per filter and there are no counts per interface.

Packet filter settings portion 109 allows creation of a packet filter in the traffic analyzer task. Creating a packet filter involves specification of four parameters: filter mode in mode field 111, filter direction in direction field 112, filter protocol in protocol field 113 and packet size in fields 115 and 116. Additionally, a packet filter needs to be activated in active field 110.

In most embodiments, there are three modes of filter: Capture buffer, Selective Display from the capture buffer and Selective Fast-Count. Mode field 111 can be a pull-down menu from which these three modes can be selected. In most embodiments, the default mode is the capture buffer mode.

Additionally, in most embodiments there are three options available for filtering the direction of packets: Incoming packets, outgoing packets and incoming and outgoing packets. Direction field 112 can also be a pull-down menu for selecting one of these options. The default option is to receive packets from an incoming direction.

The filter can also filter packets for protocol. Any of the supported protocols can be chosen in a protocol field 113. Protocol field 133 can be a pull-down menu that includes all of the supported protocols.

Packets can also be filtered by size. In most embodiments, a packet size field 114 is used to activate size filtering. If the packet size field 114 is set to active, a constant byte length and a limit of packet byte length to be filtered are specified. The constant byte length parameter is inputted at length field 115 and only packets of that length are then captured. A limit field 116 can also be set to indicate the maximum number of bytes captured for each packet. Packets that are longer than the value indicated in limit field 116 are clipped. The limit field 116 parameter is used when there is a need to capture as many packets as possible but only a certain number of bytes from the packet are important. As such, the limit field 116 parameter is less than the length field 115 parameter. When a clipped packet is displayed by the traffic analyzer process, the unrecorded portion of the packet is filled with zeros, which may cause errors in the decoding and display of the packet. If the packet size field 114 is set to inactive, then there is no filtering based on packet size.

Session Emulators

Session emulator task types are used to generate verified data traffic in order to test bridges and network devices by emulating a busy network environment. In one embodiment of the invention, three types of session emulator task types are supported: multi-protocol session emulator (MPSE) and two single-protocol session emulators (LLC2 and SDLC).

A multi-protocol Session Emulator (MPSE) is used to test bridges and network devices by emulating a busy, multi-protocol, multi-LAN media network environment. Every packet generated by the session emulator is validated for correct sequence and receipt, data integrity and length. Traffic streams are configured on one station, i.e. the network device that hosts the session emulator, and packets are sent to other stations in test network 10 (FIG. 1). In most embodiments, packets are echoed back to the originating station (i.e., the task host network device). In a routing environment, a session emulator process listens to routing updates to learn what other network devices are present in test network 10, what particular protocols are configured, and what network addresses to use. In a bridged or switched environment, a session emulator process will generate network address to use. The multi-protocol session emulator (MPSE) task type uses the available information to create all possible traffic streams available between stations. For each station, a MPSE process creates traffic streams to every other station that is configured for the same protocol.

In most embodiments, a session emulator task type supports several user-defined characteristics. For example, a session emulator process can maintain a detailed log of data, sequence and missing errors for each of the user-defined characteristics. Each traffic stream can be configured individually for packet generation rate and length. Packet lengths can be constant, incrementing or random over a range. Traffic streams can generate packets at a continuous rate or in bursts. The duration of the bursts and the delay between bursts can be defined as constant values or as random over a range. Sliding windows can also be supported.

Figure 5A:
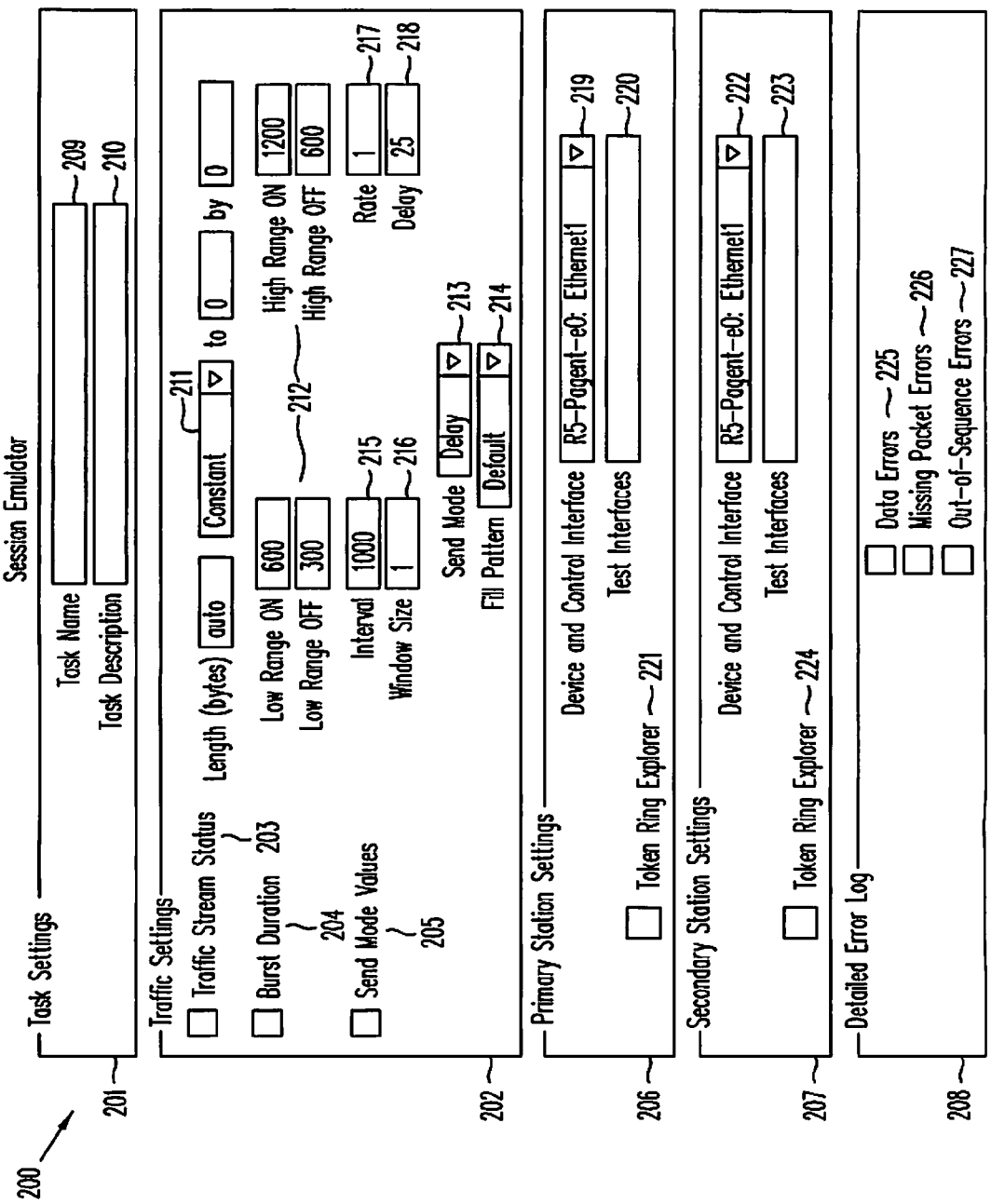
FIG. 5A shows an example of a multi-protocol session emulator task template.

FIG. 5A shows an example template 200 for a multi-protocol session emulator task type. Template 200 includes a task settings portion 201, a traffic settings portion 202, a primary station settings portion 206, a secondary station settings portion 207 and an error log portion 208. The task settings portion 201 includes a task name field 209 for entering a name for the task and a task description field 21 for entering a description of the task.

Traffic settings portion 202 includes fields for controlling the traffic stream. Selecting the traffic settings includes: activating a traffic stream status field 203, selecting the length of the packets in length field 211, controlling the burst mode in fields 204 and 212, selecting the send mode values in field 205 and 213 and adding a fill pattern in fill pattern field 214. The traffic stream status field 203 indicates whether the traffic stream is active or inactive. The default is active, but the traffic stream can be deactivated.

The length field 211 determines the length of the traffic stream packets in bytes. The default length is "auto", which includes all headers plus the data array. However, packet length in length field 211 can also be set to a constant value, to an incrementing value or to a random value in a pull-down menu portion of length field 211. The length of the packet can be less than the data array and headers. If the length is greater than the data array and headers, then a fill pattern is used to define the additional bytes in the packet. The length can be set to increment by one or by some other user defined value or to be a random length controllable by appropriate settings of the "to" and the "by" portion of length field 211.

In most embodiments, session emulator task types default to sending packets at a specified continuous rate. The user can also select a burst mode of sending packets by, in template 200, activating the burst duration field 204 and specifying the burst characteristics in characteristics field 212. Burst durations are specified by low-on and high-on portion of field 212 and a low-off and high-off portion of field 212. The low-on and high-on portions give the range of times that packets are sent and low-off and high-off portions give the range of times between packets.

In most embodiments, each traffic stream sent by the session emulator can be set to one of three send modes: "interval", "rate" or "delay", where the default value is "delay". The send mode determines the traffic generation rate. Send mode values field 205 activates user defined send mode parameters, otherwise the send mode parameters are set to the default values. The user-defined send mode is entered, usually by selection from a pull-down menu, in send mode field 213. Appropriate parameters for each of the user-defined send modes are entered in interval field 215, window size field 216, rate field 217 and delay field 218.

The interval parameters in interval field 215 set the packet generation rate to a fixed interval between packets, usually measured in milliseconds, when send mode field 213 is set to "interval". For packet generation intervals greater than one second, it is often easier to use the rate mode. The rate parameters entered in rate field 217 set the packet generation rate to a fixed interval between packets in seconds when send mode field 213 is set to "Rate". Rate mode is used when the packet generation rate is greater than one second and is useful for testing a specific feature between a small number of network units, or interfaces. The delay parameters entered in delay field 218 set the delay, usually measured in milliseconds, between packets generated in each traffic stream. Each traffic stream starts by sending a packet to the test interface. The test interface sends a packet back to the originating interface. When the returning packet is received, the next packet is sent. Delay refers to the time since the last packet was sent. The session emulator process will wait at least one millisecond before sending the next packet. The one millisecond value limits the maximum rate at which packets are sent. The delay parameter adds to the one millisecond delay.

A window size parameter is entered in window size field 216 when the send mode is "delay". Window size is similar to the concept of a sliding window. The window size determines how many packets can be sent out before one is required back. For example, if the window size is set at 2, the session emulator will send out two packets but cannot send out another until either one is received back or until the send-delay time-out is exceeded, in which case it is assumed that a packet was dropped.

A fill pattern parameter, which determines a fill pattern for the packet, can be added in fill pattern field 214. A packet includes a data link header, a network header, test data (often about 20 bytes) and a fill pattern. In most embodiments, fill patterns are chosen in fill pattern field 214 by indicating one of several types of fill patterns from a pull-down menu. In most embodiments, the default pattern is a start byte of 0 and an increment of 1 (i.e., the filled bytes are set to 0, 1, 2, . . . ). Additionally, an "interface" pattern may be chosen where the start value is the interface number and the increment is zero, which results in filling the packet with the interface number. This is useful when it is suspected that packets sent along one path are corrupting packets sent along another path. Also, a "sequence" pattern may be chosen and used if the user wants packets from all emulator processes to have a different pattern. The start and increment values can be based on the packet sequence number.

There are two stations for each session emulation task: the primary station and the secondary station. Station settings are configured in primary station settings portion 206 and secondary station settings portion 207. Traffic streams are configured on one station and packets are sent to other stations. Packets are then echoed back to the originating station. For each station, the session emulator task creates traffic streams to every other station that is configured for the same protocol. Configuring the station settings involves selecting the device and control interface in device and control interface fields 219 and 222 and selecting the test interfaces in test interfaces fields 220 and 223. If the interface is a Token Ring interface, then the token ring explorer is activated in token ring explorer fields 221 and 224. The device and control interface fields 219 and 222 can be pull-down menus giving all available options. Parameters entered into test interface field 220 and 223 can be entered directly or may also be entered through a pull-down menu. Each of the primary station and the secondary station must connect one of their interfaces to a common media. These connection interfaces will not be available to participate in the test. For a Token Ring interface, the process is begun by sending explorer packets to the target interface to learn a RIF (routing information field).

This is begun by activating token ring explorer fields 221 and 224. In detailed error log portion 208, the session emulator task can be assigned to log specific errors. In template 200, the session emulator task can be set to log data errors by activating the data errors field 205, missing packet errors by activating the missing packet errors field 226 and out-of-sequence errors by activating the out-of-sequence errors field 227.

The single protocol session emulators generate verified data traffic, emulating a network environment using a LLC2 (Logical Link Control) protocol, a SDLC (synchronous data link control) protocol or any other data link level protocol. Traffic streams are configured on one station and packets are sent to a second station. The primary station establishes a connection with the secondary station before sending data packets. The secondary station echoes back the data packet it receives and the primary station verifies the returned packet against the original packet by, for example, examining the checksum. The primary station then proceeds to send the next packet or waits for a period of time equal to an inter-packet delay parameter.

Figure 5B:
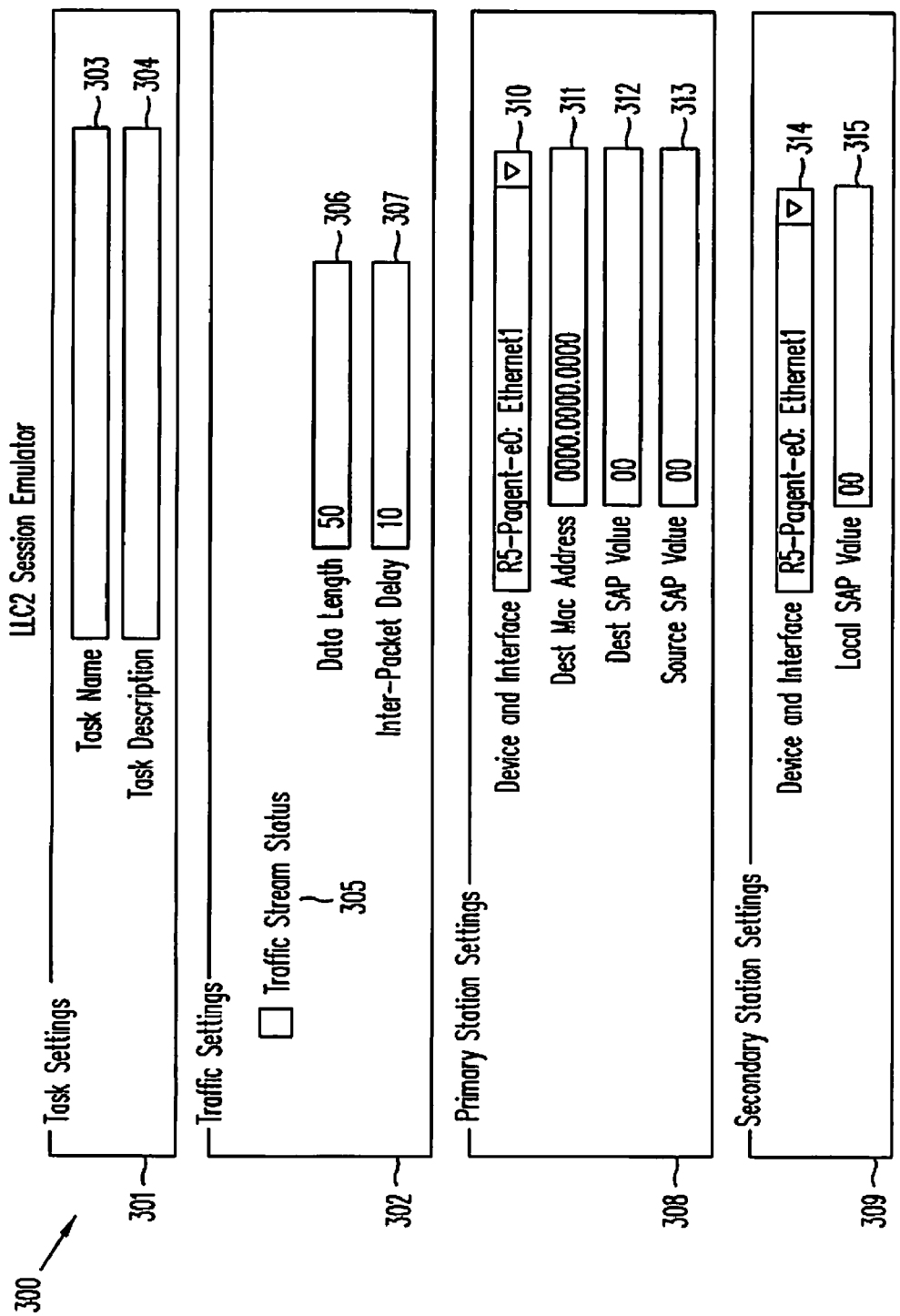
FIG. 5B shows an example of a LLC2 single-protocol session emulator task template.

FIG. 5B shows a template 300 for an LLC2 session emulator task. Template 300 includes a task settings portion 301, a traffic settings portion 302, a primary station settings portion 308 and a secondary station settings portion 309. Task settings portion 301 includes a task name field 303, where the name of the task is entered, and a task description field 304, where a description of the task is entered.

Traffic settings portion 302 includes a traffic stream status field 305 which indicates whether the traffic stream is active or inactive. The default setting of traffic stream status field 305 is active. Packet length is entered in data length field 306 and an interpacket delay time is set in inter-packet delay field 307. The data length is the length, usually in bytes, of the data array portion of the packet. The inter-packet delay is the minimum delay between packets. If the actual packet round trip takes longer than the inter-packet delay specified, the effective delay would be the round trip time.

Configuring an LLC2 primary station in primary station settings 308 involves selecting the device and interface in a device and interface field 310, entering a destination MAC address in a destination MAC address field 311, entering a destination SAP (service advertising protocol) value in a destination SAP value field 312, and entering the source SAP value in the source SAP value field 313. In most embodiments, device and interface field 310 can be a pull-down menu. Configuring an LLC2 secondary station in secondary station settings 309 involves selecting the device and interface in device and interface field 314 and entering a local SAP value in local SAP value field 315.

Figure 5C:
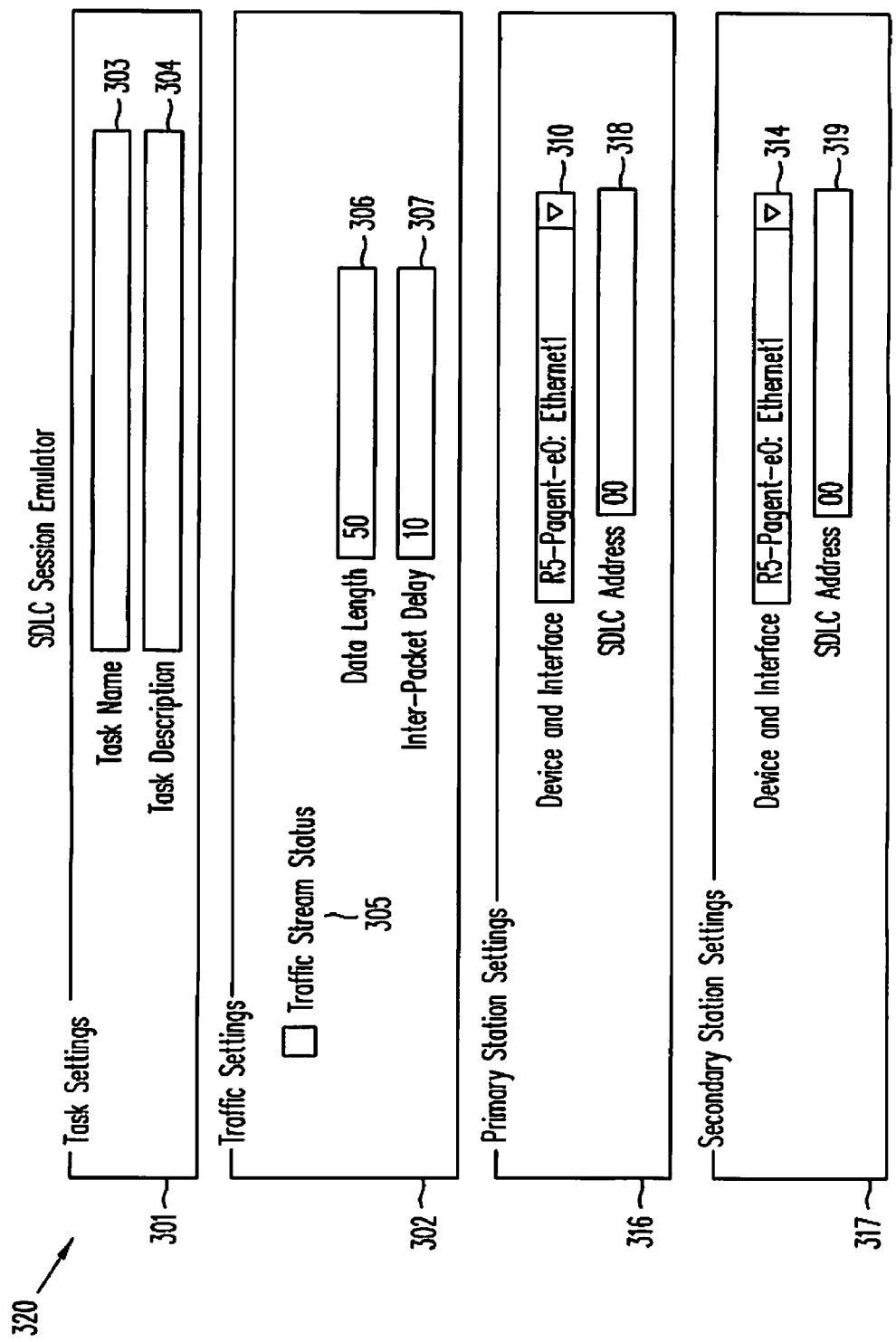
FIG. 5C shows an example of a SDLC single protocol session emulator task template.

FIG. 5C shows a session emulator task template 320 for a SDLC protocol session emulation task. Template 320 includes task settings portion 301 and traffic settings portion 302, as did LLC2 session emulator task template 300 of FIG. 5B. Primary station settings portion 316 includes device and interface field 310, which was discussed above, and a SDLC address field 318. Secondary station settings portion 317 includes device and interface field 314, which was discussed above, and SDLC address field 319.

Embodiments of a NVT system according to the present invention can include session emulator task types, and templates to create the associated session emulator tasks, for any session emulation protocol.

Large Network Emulator

A large network emulator task type is used to fill routing tables by emulating a network device with access to a large network. Each large network emulator task type uses a specific routing protocol. Examples of routing protocols include BGP (Border Gateway Protocol), EIGRP (Enhanced Interior Gateway Routing Protocol), IP RIP (Internet Protocol Routing Information Protocol), IPX RIP, and OSPF (Open Shortest Path First).

A BGP large network emulator task type is used to populate user defined routing tables by emulating a network device with access to a large network using BGP protocol. BGP is used to populate routing tables that easily create multiple peers to stress a network device with multiple BGP TCP circuits. For each network advertisement, path length is random within a range defined by the task. Each routing process can be set to "flap," causing the process to act like a network device that is cycling on and off. The network device will appear to be active for the time specified and then inactive for the time specified. Each process advertises networks that increment from a starting network address. For each network advertisement, path values are random within ranges defined by the user.

Figure 6A:
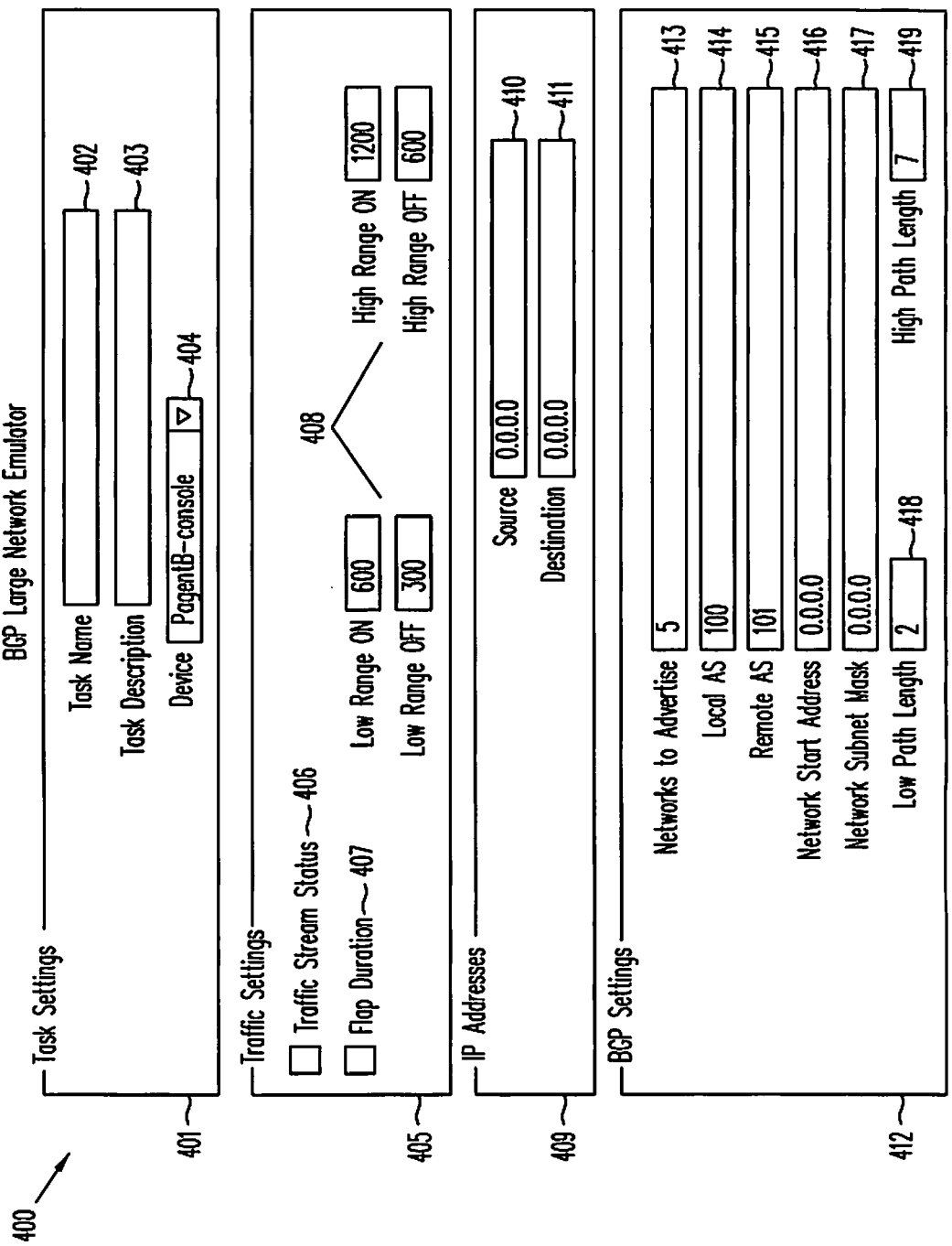
FIG. 6A shows an example of a BGP large network emulator task template.

FIG. 6A shows an example of a BGP large network emulator task template 400. Template 400 includes a task settings portion 401, a traffic stream settings portion 405, an IP addresses portion 409 and a BGP settings portion 412.

Task settings portion 401 includes a task name field 402 where the task name is entered, a task description field 403 where a description of the task is entered, and a device field 404 where the host, i.e. the network device that hosts the task type that executes the task, is entered.

Traffic stream settings portion 405 includes a traffic stream status field 406, which activates or deactivates the traffic stream. If the traffic stream status in traffic stream status field 406 is deactivated, then the BGP task type will not generate packets and will stop all traffic streams on the indicated interface. Field 406 can be utilized to stop a process that is already executing.

Traffic stream settings portion 405 also includes flap duration activation field 407 and flap range fields 408. By default, the routing process sends updates continuously. By activating the flap duration in flap duration activation field 407, updates are "flapped" at intervals specified in flap range fields 408. Flapping causes the process to act like a network device that is cycling between on and off. The network device will appear to be active for the time specified and then inactive for the time specified. In some embodiments, the flapping range fields 408 includes a low on field, a high on field, a low off field and a high off field. The network device will appear to be on for random periods of time between the low on value and the high on value. The network devices "on" periods will be separated by random periods of time between the low off value and the high off value.

The IP addresses are entered in IP addresses portion 409. IP addresses portion 409 includes a source address field 410 for entering the IP address assigned to the emulated network device and destination address field 411 for entering the IP address of the network device to which packets are being sent.

The BGP protocol parameters are specified in BGP settings portion 412. BGP settings portion 412 includes networks to advertise field 413, local AS field 414, remote AS field 415, network start address field 416, network subnet mask field 417, low path length field 418 and high path length field 419. The number of networks the process defined by the task is to advertise is entered into networks to advertise field 413. The local autonomous system number is entered into the local AS field 414. The remote autonomous system number, which must match a configured autonomous system number on a remote network device, is entered at remote AS field 415. The network start address is entered into network start address field 416. Routes to a range of networks starting with the network start addresses are advertised by the process defined in this task. The subnet mask address is entered in to the network subnet mask field 417. The range of addresses for advertised networks start with the network start address and increments by the network subnet mask. The number of autonomous systems in each route path is a random value between the low path length entered into the low path length field 418 and the high path length entered into the high path length field 419.

FIG. 6B shows a sample EIGRP large network emulator task template 420. An EIGRP large network emulator task type is used to populate user-defined routing tables by emulating a network device with access to a large network using EIGRP protocols. In most embodiments, the size of the table and the range of metrics are defined by the user. In some embodiments the size of the table is limited (for example to 64K).

As well as using the random number generators to create large numbers of network advertisements, the first 100 networks can be completely defined by the user. This option can be used for feature testing of test network 10 (FIG. 1). The process advertises a range of network addresses that increment from a starting network address. For each network advertisement, path values are random within a range defined by the user. As was discussed above with the BGP large network emulator task type, each routing process can be set to "flap," causing the process to act like a network device that is cycling between on and off. The network device will appear to be active for the time specified and then inactive for the time specified.

Template 420 of FIG. 6B includes task settings portion 401, traffic stream settings portion 405, an IP-EIGRP settings portion 421, an EIGRP Network settings portion 422 and an exterior EIGRP settings portion 441. The task settings portion 401 and the traffic stream settings portion 405 have been discussed above. Configuring the EIGRP routing process includes specifying IP EIGRP settings in IP-EIGRP settings portion 421, specifying EIGRP Network settings in EIGRP Network Settings portion 422 and specifying exterior EIGRP settings in exterior EIGRP settings portion 441.

Specifying the EIGRP Network settings in EIGRP network settings portion 421 includes entering the IP address of the network device where packets originate in source address field 423, entering the identification number of the local autonomous system in local AS field 424, and entering the number of networks the process is to advertise in the networks to advertise field 425.

Specifying the EIGRP Network settings includes entering the appropriate parameters in field 426 through 440. The number of addresses each TLV (tag length value) will have is entered into addresses per TLV field 426. In some embodiments, the maximum for the addresses per TLV value is 100. The starting network address to use in advertising the range of networks is entered in network start address field 427. The subnet mask address, used as an increment value for subsequent network addresses, is entered in network subnet mask field 428. The range of distances (i.e., number of hops) between the source and destination for each network advertised in entered in low hop count field 429 and high hop count field 435. The range in delay the process creates for each advertised network is entered in low delay per hop field 430 and high delay per hop field 436. The range of differences between the lowest and highest frequencies available for network signals is entered into low bandwidth field 431 and high bandwidth field 437. The range of maximum transmission unit (MTU) for each network advertised is entered into low MTU field 432 and high MTU field 438. The range of ratios expected to received "keepalives" from a link for each network advertised is entered into low reliability field 433 and high reliability field 439. The range of load, i.e. the ability of a network device to distribute traffic over all its network ports that are the same distance from the destination address, for each network advertised is entered into low load field 434 and high load field 440.

Specifying the exterior EIGRP settings in exterior EIGRP settings portion 441 includes entering the identification of the EIGRP network device that redistributes the route in network device ID field 442, entering the autonomous system number of the destination in remote AS field 443, entering an optional administrative identification in admin tag field 444, entering the identification for the external protocol in external protocol field 445, entering the metric for the external protocol in external protocol metric field 446, and entering the bit flag for default routing in flag value field 447. Flags include 0x01 for external route and 0x02 for candidate default.

An IP RIP large network emulation task type is used to populate user-defined routing tables by emulating a network device with access to a large network using IP protocol. Multiple routing processes can be configured in a large network emulator. As well as using the random number generators to create large numbers of network advertisement, the first 100 networks can be completely defined by the user. Path values can be random within a range defined by the user. Each routing process can be set to "flap."

Figure 6C:
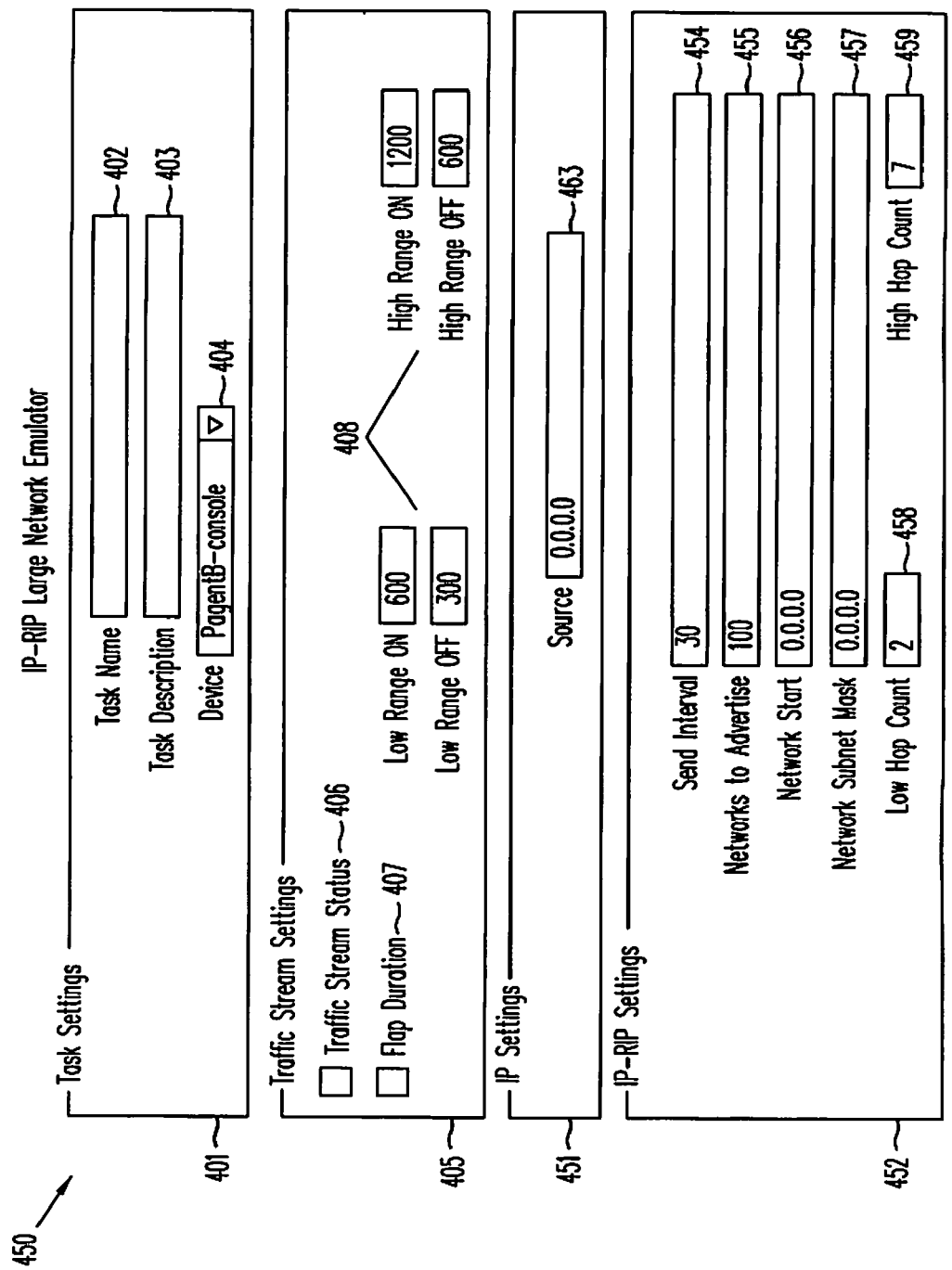
FIG. 6C shows an example of an IP RIP large network emulator task template.

FIG. 6C shows an example of an IP-RIP large network emulator task template 450. Template 450 includes task settings portion 401, traffic stream settings portion 405, IP settings portion 451 and IP-RIP settings portion 452. Task settings portion 401 and traffic stream settings portion 405 are discussed above. The IP settings in IP settings portion 451 are specified by entering the IP source address in source field 453. The IP RIP settings are specified in IP RIP settings portion 452 by entering how often the routing process will send update packets in send interval 454, entering the number of routes the process will advertise in networks to advertise field 455, entering the starting network address to use for advertising access to networks in network start field 456, entering the subnet mask address used as an incrementing value for subsequent network addresses in network subnet mask field 457, and entering the range of distances for each network advertised in low hop count field 458 and high hop count field 459.

The IPX RIP large network emulator task type is used to populate user-defined routing tables by emulating a network device with access to a large network using IPX protocols. Multiple routing processes can be configured in the large network emulator. As well as using a random number generator to create large numbers of network advertisements, the first 100 networks can be completely defined by the user. Each routing process can advertise access in increments from a starting network address. For each network advertisement, path values are random within a range defined by the user. Each routing process can be set to "flap," causing the process to act like a network device that is cycling between on and off.

Figure 6D:
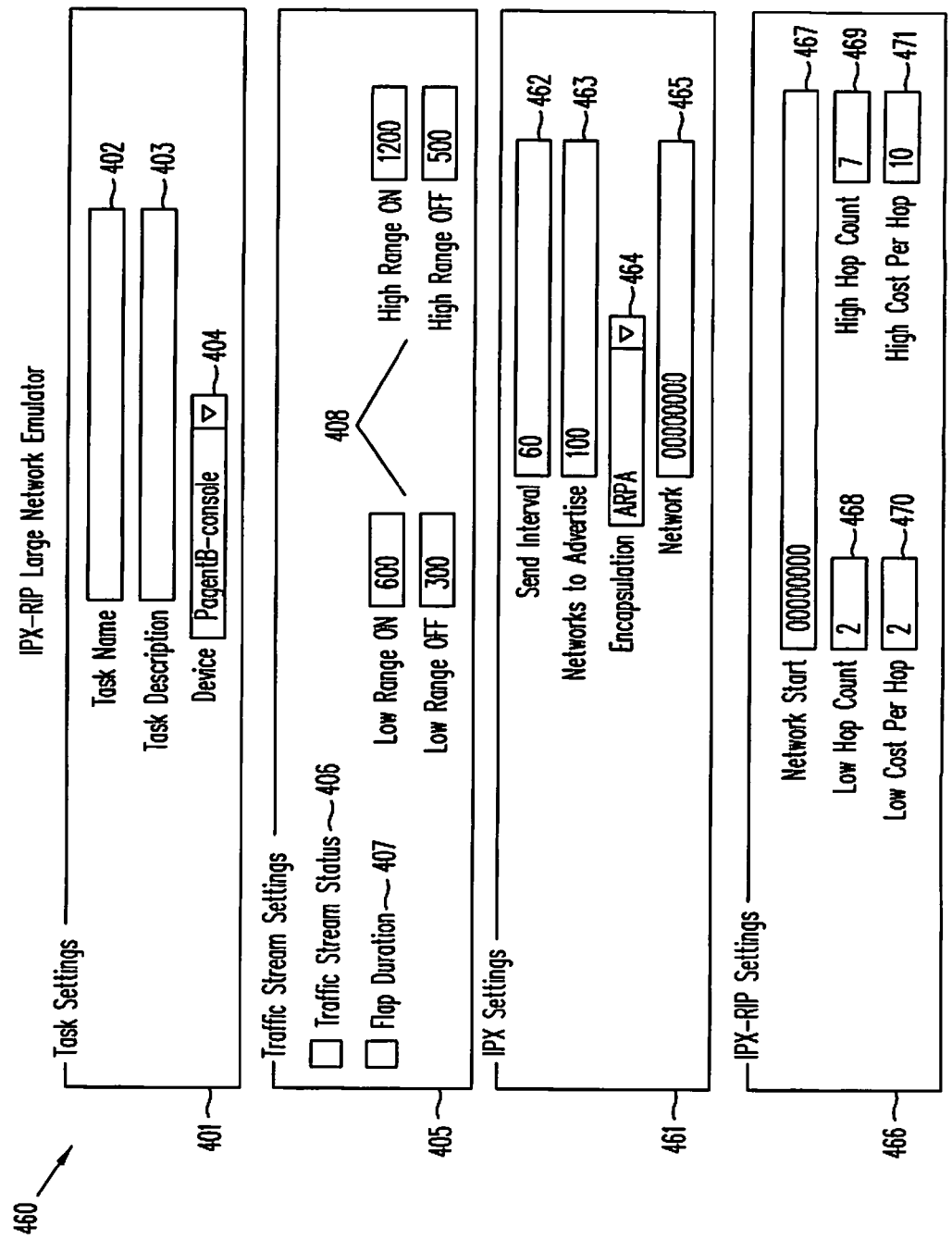
FIG. 6D shows an example of an IPX RIP large network emulator task template.

FIG. 6D shows an example of a IPX RIP large network emulator task template 460. Template 460 includes task settings portion 401, traffic stream settings portion 405, IPX settings 461 and IPX RIP settings 466. Task settings portion 401 and traffic stream settings portions 405 are discussed above. Specifying the IPX settings in IPX settings portion 461 includes entering how often the routing process will send update packets in send interval field 462, entering the number of routes the process will advertise in networks to advertise field 463, selecting the appropriate data link encapsulation for the IPX packets in pull-down menu encapsulation field 464, and entering the IPX network address assigned to the process in network address field 465. Specifying the IPX RIP settings in IPX-RIP settings portion 466 includes entering the starting network address to use for advertising access to networks in network start field 467, entering the range of distances for each network advertised in low hop count field 468 and high hop count field 469, and entering the random cost range for each advertised network in low cost per hop field 470 and high cost per hop field 471. The advertised cost is the hop count times the cost per hop.

An OSPF large network emulator task type is used to populate routing tables and OSPF databases by emulating a network device with access to a large network using OSPF protocol. Multiple routing processes can be configured. Each process allows the configuration of a phantom network. The user can set the size of the phantom network by the number of network devices and how they are connected, the number of stub networks, summary links and external links. The process uses this to create a database of link states that it passes to any device running OSPF in network under test 11 (FIG. 1). Each routing process can advertise access to class A networks with, in some embodiments, up to 55,000 network devices and over 500,000 sub-networks. Each routing process can be set to "flap," causing the process to act like a network device that is cycling between on and off.

FIG. 6E shows an example of an OSPF large network emulator task template 475. Template 475 includes task settings portion 401, traffic stream settings portion 405, IP settings portion 476 and OSPF settings portion 478. Task settings portion 401 and traffic stream settings portion 405 have been previously discussed. Setting the parameters in IP settings portion 476 includes entering the IP address of the network device where packets originate in source field 477. Specifying the OSPF protocol settings in OSPF settings 478 includes entering the identification of the network device hosting the process in network device ID field 479, entering the identification of the OSPF area where the process originates in area field 480, entering the class A network address (from 1 to 127) in network field 481, entering the number of stub networks in which each network device is to advertise the connection in stub networks field 482, entering the number of network device clusters in cluster field 483, entering the number of rows in the network device cluster matrices in rows per cluster field 484, and entering the number of columns in the network device cluster matrix in columns per cluster field 485.

Summary links, activated in summary links field 486, describe path destination outside the OSPF area that share the same autonomous system. Advertising summary links involves activating summary links in summary links field 486, entering the number of summary links to advertise in number of links field 487, entering the identification number of the network device advertising the summary links in network device index field 488, entering the starting network address to use in advertising summary links in network start field 489 and entering the subnet mask address to use as an increment value for subsequent network address in subnet mask field 490.

External links describe path destination outside of the autonomous system.

Advertising external links includes activating external links in external links field 491, entering the number of external links to advertise in number of links field 492, entering the identification number of the network device advertising external links in network device index field 493, entering the starting network address to use in advertising external links in network start field 494, and entering the subnet mask address to use as an increment value for subsequent network addresses in subnet mask field 495.

Figure 7:
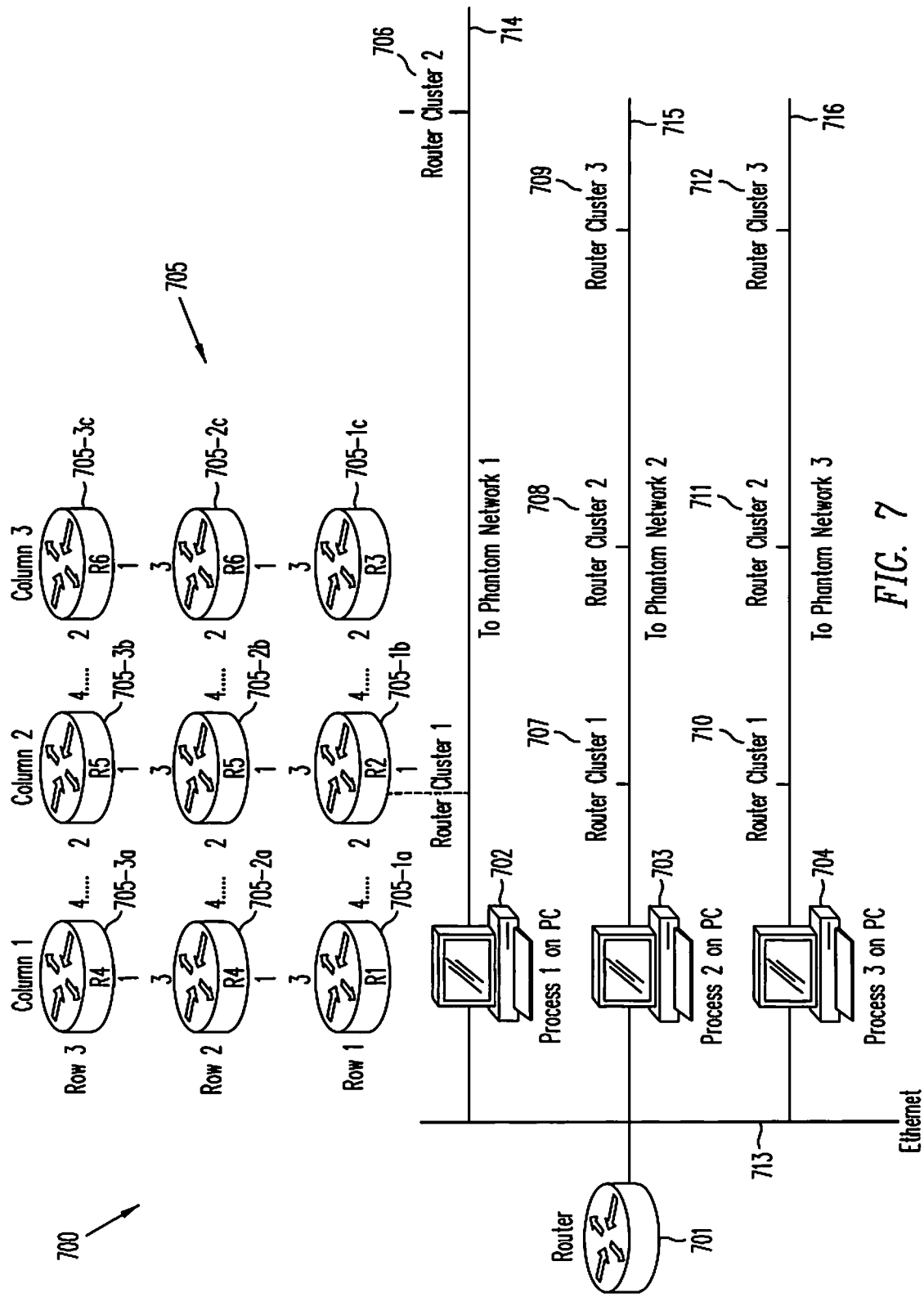
FIG. 7 shows a block diagram of a portion of a test network having large network emulation network devices executing an OSPF large network emulation process and the associated phantom networks created.

FIG. 7 shows a portion of test network 10 (FIG. 1) that includes a large network emulator. Network device 701 can be one of probe network devices 2 through 5 (FIG. 1) or can be a network device of network under test 11. In FIG. 7, network device 701 is coupled by an ethernet protocol to computers 702, 703 and 704. Computers 702, 703 and 704 each execute OSPF large network emulation task to emulate phantom network 714, 715 and 716, respectively. Therefore, each of computers 702, 703 and 704 act like a network device running OSPF with access to a large network of network devices. Each of phantom networks 714, 715 and 716 includes a number of network device clusters. For example, phantom network 714 includes network device clusters 705 and 706; phantom network 715 includes network device clusters 707, 708 and 709; and phantom network 716 includes network device clusters 710, 711 and 712. In one embodiment of the invention, there can be as many as 250 clusters per phantom network. The computer, for example computer 702 is the active network device connecting network device 701 with phantom network 714.

As an example, network device cluster 705 includes an array of coupled network devices 705-1a to 705-3c, having rows 1 through 3 and columns a, b and c. In general, the array can include any number of virtual network devices. Each network device cluster, for example cluster 705, of a phantom network is a matrix of virtual network devices organized in rows and columns. Each network device is coupled to other network devices based on its position in the cluster matrix. The four interfaces for each network device are labeled 1 through 4 where interfaces 3 and 4 are designated network devices and set the network address. For example, network device 705-2b is coupled to network device 705-3b through interface 3, network device 705-2c through interface 4, network device 705-1b through interface 1 and network device 705-2a through interface 2.

Each OSPF process is assigned a unique IP address within the IP sub-network. Each process must be in the same OSPF area as is network device 701. If there are three OSPF tasks, each process task appears as a separate network device with access to a separate phantom network to the network device under test (which may or may not be network device 701).

In one embodiment of the invention, the IP address for a network device is in the format n1.n2.n3.n4 where n1 is the class A network number configured for the process, n2 is the cluster number, n3 is the network device number and the first four bits of n4 are the interface number. The subnet mask for each subnet is 255.255.255.240 (0xFF.FF.FF.F0). Network device interfaces 1 to 4 are coupled to other network devices. Network device interfaces 5 through 14 are coupled to stub networks.

The number of routes that each process will transmit for the computer to the network device in the same area (e.g., from computer 702 to network device 701) involves calculating the number of networks connecting the rows (R=(# rows−1)*# columns), calculating the number of networks connecting the columns (C=(# columns−1)*# rows), calculating the number of stub networks (S=#rows*#columns*#stubs/network device), calculating the total number of networks per cluster (CL=R+C+S) and calculating the total number of sub-networks for all of the clusters (T=#clusters*CL).

Device Queries

Queries are used to retrieve and display information from a network device. Query results can be displayed as dynamic graphs or as raw data. In most embodiments, graphs are utilized for displaying CPU and memory utilization and the number if IP routes. Raw data is displayed when querying devices for such information as neighbors, paths, interfaces, border network devices and traffic information. In one embodiment, CPU activity, memory, and IP routing can be graphically displayed using device query tasks. Additionally, BGP data, EIGRP data, OSPF data, multi-protocol session emulator data, single protocol session emulator data, and traffic analyzer data can be obtained, displayed and stored using device query tasks. In general, any number of devices can be queried to obtain any available real time or statistical data regarding test network 10 (FIG. 1) and the test processes. Information provided by a device query process can be used to determine resource utilization and to solve networking problems.

FIG. 8A shows a sample task template 800 that can be used as at least part of a template for all device query tasks. Template 800 includes a task settings portion 801 and a query settings portion 802. Task settings portion 801 includes a task name field 803 where the name of the task is entered, a task description field 804 where a description of the task is entered, and a device field 805 where the device to query is selected. In most embodiments, device field 805 is a pull-down menu where all devices in network 10 (FIG. 1) are listed. In query settings portion 802, the number of times to query the device is entered into times to query field 106 and the time interval between queries is entered into delay between queries field 807. In some embodiments, devices can be continuously queried by entering a key value, for example 0, in times to query field 106. If the results are to be saved, the save results field 808 is activated and a filename is entered into filename field 809.

A query CPU task type is used to query a specified device for its CPU utilization percentage. In most embodiments, the results are graphically presented as CPI percentage over time. The number of times to query and delay between queries can determine the number of plot points on the graph. Graphs can be immediately displayed as well as stored. Template 800 in FIG. 8A can be utilized to create a query CPU task.

A query memory task type is used to query a specified device for its memory (DRAM) utilization. The results can be displayed in graphic form showing total memory and memory utilization over time. The number of times to query and delay between queries determines the number of plot points on the graph. Graph data can be immediately displayed and stored. Template 800 in FIG. 8A can be utilized to create a query memory task.

A query IP route task type is used to query a specified device for its number of IP routes. The results can be displayed in a graph of the number of IP routes over time. The number of times and delay between queries can determine the number of plot points on the graph. Graph data can be immediately displayed and stored. Template 800 in FIG. 8A can be utilized to create a query IP route task.

A query BGP task type is used to query a specified device for statistical information such as the contents of IP routing tables, caches, and databases. Information provided can be used to determine resource utilization and solve network problems. The results of each query can be displayed as text and can be executed immediately or saved to a file for later review. Status information portion 810 of FIG. 8B is appended to template 800 of FIG. 8A to form a task template for a query BGP task type. The statistical information selected for retrieval is chosen in status information portion 810 by activating the various fields. A neighbors field 811 is activated to retrieve detailed information on TCP and BGP neighbor connections; summary field 820 is activated to retrieve a summary of BGP neighbor status; CIDR field 812 is activated to retrieve the only routes with non-natural subnet masks; inconsistent AS field 821 is activated to retrieve the only routes with inconsistent origin AS; path field 813 is activated to retrieve path information; dampened paths field 822 is activated to retrieve information on paths suppressed due to dampening; peer groups field 814 is activated to retrieve information on peer groups; and flap statistics field 823 is activated to retrieve flap statistics on routes. Additionally, fields can be set so that the retrieved data is filtered: a network field 815 is activated and a particular network address is entered in field 824 in order to display data from a particular network in the BGO routing table; community number field 816 is activated and community numbers are entered in field 825 in order to retrieve data from routes matching the community numbers; community list field 817 is activated and community lists are entered in field 826 in order to retrieve data from routes matching the community lists; filter list 818 is activated and filter lists are entered into field 827 in order to display routes conforming to the filter list; and regular expression 819 is activated and a regular expression is entered in field 828 in order to display routes matching the regular expression.

A query EIGRP task type is used to query a specified device for statistical information such as the contents of IP routing tables, caches, and databases. The results of each query are displayed as text and can be executed immediately or saved to a file for later review. Status information portion 829 of FIG. 8C is appended to template 800 of FIG. 8A to form a task template for a query EIGRP task type. Various fields in status information portion 829 are activated in order to retrieve data from the specified device: Neighbors field 830 is activated in order to retrieve detailed information on TCP and EIGRP neighbor connections; interface field 832 is activated to retrieve detailed information on neighbor interface; traffic field 831 is activated in order to retrieve traffic information; and topology field 833 is activated in order to retrieve detailed information on destinations advertised by neighboring network devices.

Figure 8D:
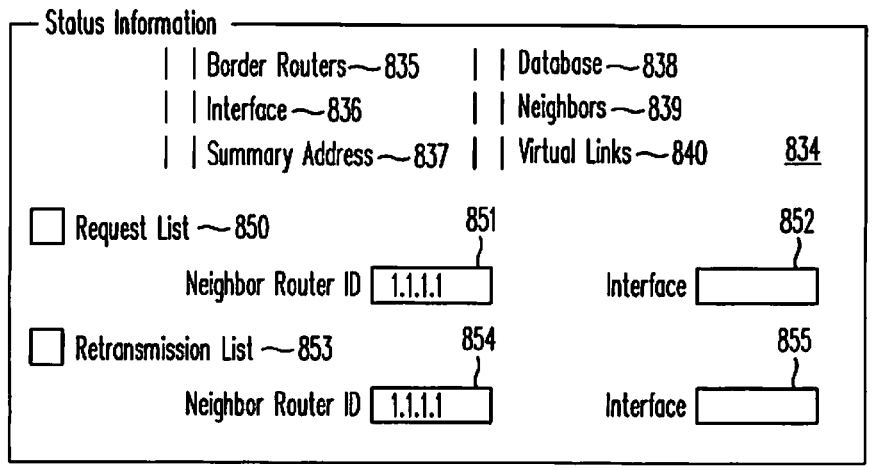
FIG. 8D shows a status information portion of a query OSPF task template.

A query OSPF task type is used to query a specified device for statistical information such as the contents of IP routing tables, caches, and databases. The results of each query are displayed as text. The task can be executed immediately or saved in a file. Status information portion 839 of FIG. 8D is appended to template 800 of FIG. 8A to form a task template for the query OSPF task type. Various field in status information portion 839 are activated in order to retrieve data from the specified device: border network devices field 835 is activated in order to display the internal routing table entries to an area border network device (ABR) and autonomous system boundary network device (ASBR); database field 838 is activated in order to display lists of information related to the data base for a specific network device; interface field 836 is activated in order to display related interface information; neighbors field 839 is activated in order to display neighbor information on a per-interface bases; summary address field 837 is activated to create aggregate addresses for OSPF; virtual links field 840 is activated to display parameters about, and the current state of, virtual links in the OSPF phantom network. Additionally, request list field 850 can be activated and a neighbor network device ID can be entered in neighbor network device ID field 851 and an interface can be entered in interface field 852 in order to retrieve the OSPF link state request list information. Also, retransmission list field 853 can be activated and a neighbor network device ID can be entered in neighbor network device ID field 854 and an interface can be entered in interface field 855 in order to retrieve the OSPF link state advertisement retransmissions for adjacencies.

Figure 8E:
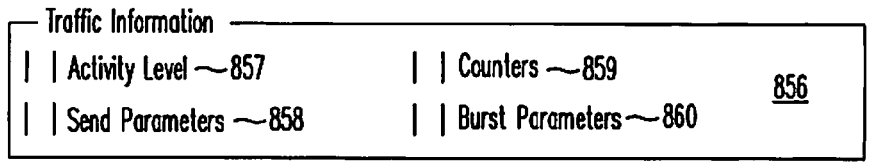
FIG. 8E shows a traffic information portion and a status information portion of a query multi-protocol session emulator task template.
Figure 8E:
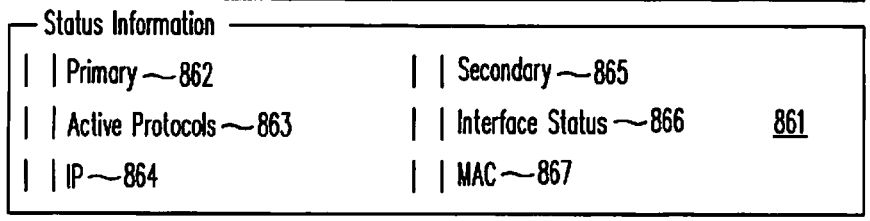

A multi-protocol session emulator query task type is used to query a specified device for statistical information, such as interface status, traffic activity and summary of addresses. The results of each query can be displayed as text and can be executed immediately or saved to a file for later review. Traffic information portion 856 and status information portion 861 of FIG. 8E is appended to template 800 of FIG. 8A in order to form a task template for the multi-protocol session emulator query task. Traffic information is requested from the device by activating fields in traffic information portion 856: activity level field 857 is activated to retrieve traffic activity level; counters field 859 is activated to retrieve traffic error counters; send parameters field 858 is activated to retrieve current send parameters; and burst parameters field 860 is activated to retrieve current burst parameters. Status information is requested from the device by activating fields in status information portion 861: primary field 862 is activated to display interface status on the primary station; secondary field 865 is activated in order to display interface status on the secondary status; active protocols field 863 is activated to display addresses for active protocols; interface status field 866 is activated to display a summary of interface status; IP field 864 is activated to display a summary of IP header information; and MAC field 867 is activated to display a summary of MAC addresses.

Figure 8F:
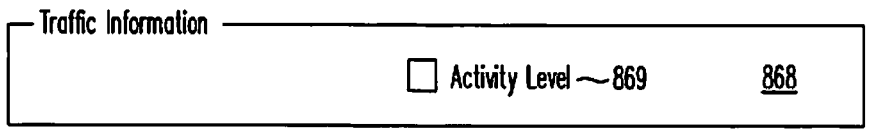
FIG. 8F shows a traffic information portion of a query single protocol task template.

A single-protocol session emulator query task type is used to query a specified device which is using LLC2 or SDLC protocols for traffic activity information. The results of each query can be displayed as text. The task can be executed immediately or saved to a file. Traffic information portion 868 of FIG. 8F is appended to template 800 of FIG. 8A to form a task template for the single-protocol session emulator query task. Traffic stream activity is retrieved by activating activity level field 869 of traffic information portion 868.

Figure 8G:
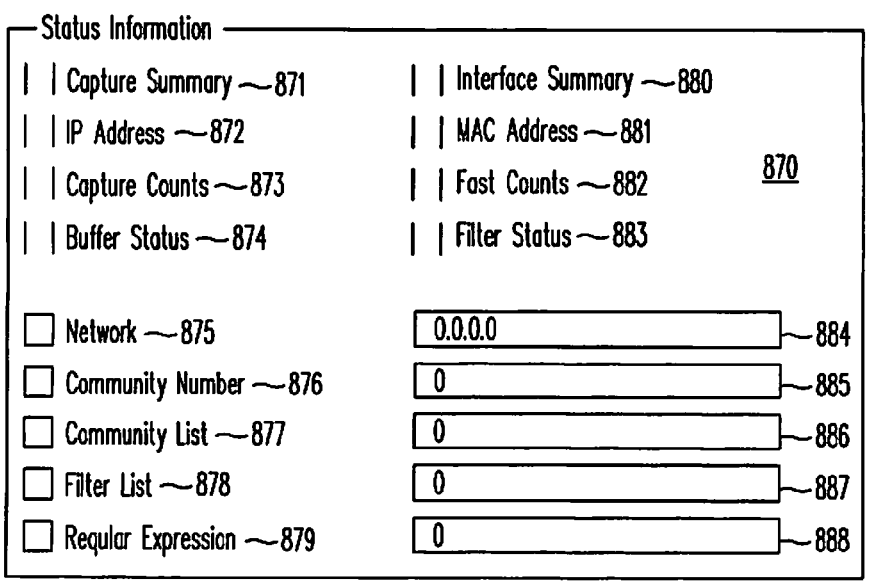
FIG. 8G shows a status information portion of a query traffic analyzer task template.

A query traffic analyzer task type is used to query a specified device for statistical information such as a summary of captured packets and interfaces, packet addresses, and counts and rates of packets. Information provided can be used to determine resource utilization and solve network problems. The results of each query can be displayed as text. The task can be executed immediately or can be saved to a file. Status information portion 870 of FIG. 8G is appended to template 800 of FIG. 8A in order to form a task template for the query traffic analyzer task type. Statistical information is selected for retrieval by activating appropriate fields in status information portion 870: capture summary field 871 is activated to retrieve a summary of captured packets from the specified device; interface summary field 880 is activated to retrieve interface configuration information from the specified device; IP address field 872 is activated to retrieve a summary of IP addresses from the specified device; MAC address field 881 is activated to retrieve a summary of MAC addresses from the specified device; capture counts field 873 is activated to retrieve the capture counts and PPS (packets per second) information from the specified device; fast counts field 882 is activated to retrieve fast counts and PPS information from the specified device; buffer status field 874 is activated to retrieve the status of capture buffer from the specified device; and filter status 883 is activated to retrieve a summary of all filters from the specified device. Additionally, fields can be set so that the retrieved data is filtered: a network field 875 is activated and a particular network address is entered in field 884 in order to display data from a particular network in the routing table; community number field 876 is activated and community numbers are entered in field 885 in order to retrieve data from routes matching the community numbers; community list field 877 is activated and community lists are entered in field 876 in order to retrieve data from routes matching the community lists; filter list 878 is activated and filter lists are entered into field 887 in order to display routes conforming to the filter list; and regular expression 879 is activated and a regular expression is entered in field 888 in order to display routes matching the regular expression.

Script Task Types

A script task type is used to automate processes at the device level. These processes lie outside of the capabilities outlined in the available task templates available to the user and include issuing commands to control a device, viewing device level activities, and creating complex profiling. In most embodiments, script supports the TCL language.

Figure 9:
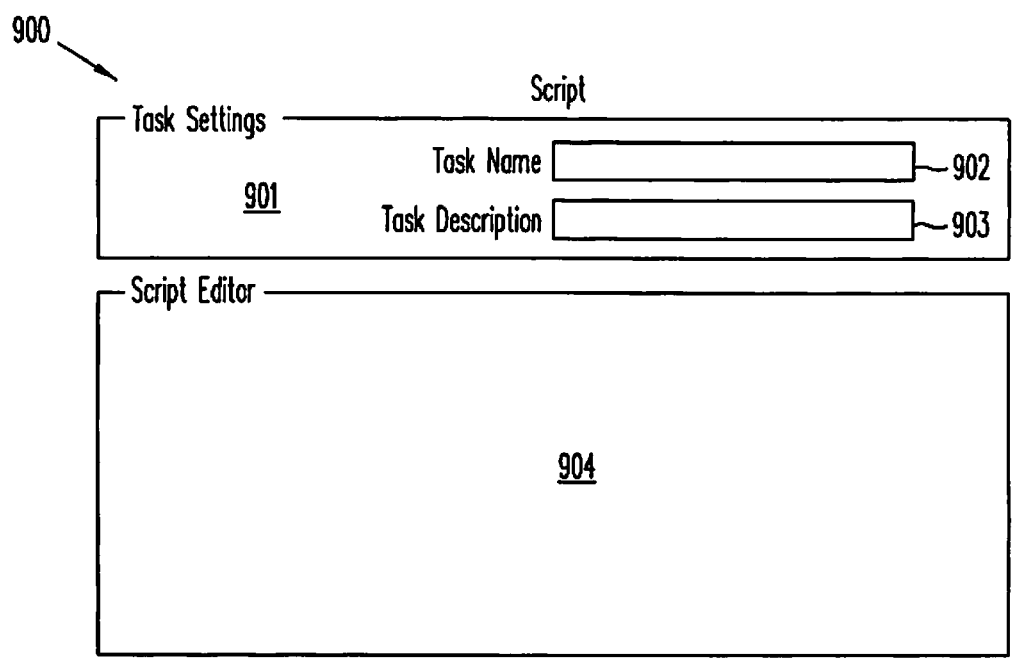
FIG. 9 shows a script task template.

FIG. 9 shows a task template 900 for the script task type. Task template 900 includes task settings portion 901 and script editor 904. Task settings portion 901 includes a task name filed 902 where the name of the task is entered and a task description portion 903 where a description of the task is entered. In most embodiments, the task is programmed in a language such as TCL by entering the program steps into script editor 904. Once created, the task can be run or saved.

Profiles

Profiling can be used to create complex network emulation and complex tests. A profile is a collection of tasks (including emulations, queries, traffic generation, and scripts) grouped together. Tasks grouped into a profile are executed together. New profiles can be created by adding individual tasks or by adding the tasks from a previously created profile into the new profile. A block diagram of the steps used to create tasks and profiles is discussed above and shown in FIG. 2. Profiles are created and edited in step 32 of FIG. 2.

Figure 10:
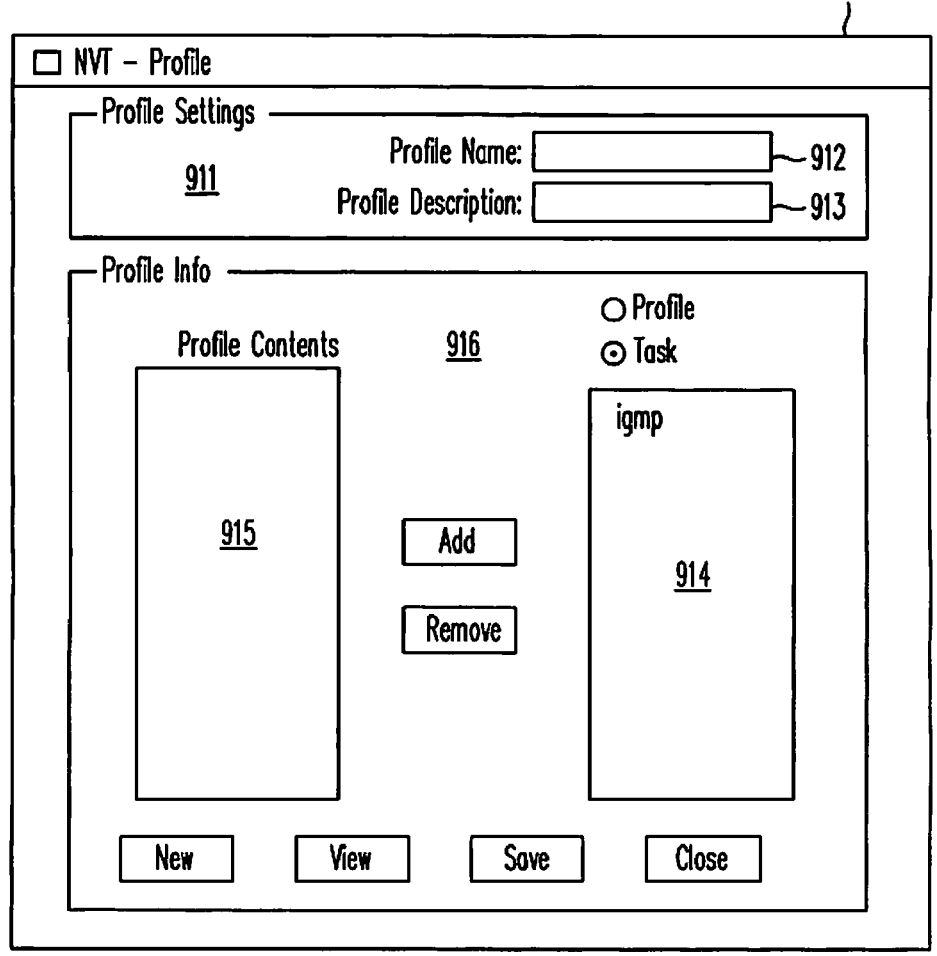
FIG. 10 shows a template for creating profiles.

FIG. 10 shows an example template 910 for creating profiles. Template 910 shows a profile settings portion 911 and a profile information portion 916. Profile settings portion 911 includes a profile name field 912 where the name of the profile is entered and profile description portion 913 where a description of the profile is entered. Profile info portion 916 includes profile contents field 915 and list field 914. Stored tasks and profiles are chosen from list field 914 for inclusion in profile contents field 915. The profile created by template 910 includes tasks and profiles listed in profile contents field 915. In most embodiments of the invention, tasks and profiles that are included in a particular profile can be edited separately (see steps 24 and 32 of FIG. 2) and the edited task or profile is automatically included in the defined profile.

CONCLUSION

A user at NVT client 14, for example, can design and run a test of network under test 11 of test network 10 utilizing the task templates described above. As is outlined in FIG. 2, the user connects with NVT server 1 at step 22 and downloads the task templates in step 23. In steps 24 and 25, the user creates new tasks and modifies existing tasks in order to create a complete testing and monitoring environment for network under test 11 (FIG. 1). The user can save tasks in step 27 or execute the task immediately in steps 29, 30 and 31. The user can also create, save or execute profiles in steps 32 through 37 of FIG. 2.

NVT server 1 receives and interprets parameters entered into task templates at NVT client 14 and forwards those tasks to the associated task types hosted on probe network devices 2 through 6 of test network 10. Each assigned probe network device executes a process using the task parameters and the task type software.

The above described embodiments of the invention are examples only and are not intended to be limiting. One skilled in the art will recognize that any combination of task types may be included in an NVT according to the present invention. Additionally, test network 10 can be of any size and configuration. For example, there may be any number of probe network devices and any number of those probe network devices can be capable of large network emulation. Additionally, test network 10 can include any number of communication servers coupled to NVT server 1. As such, the invention is limited only by the following claims.

TABLE 1

Table 1: Supported Combinations of Protocol-Media-Encapsulations for one embodiment of the invention.

| Protocol | Encap == Media | ARPA | SNAP | SAP | Novell-Ether | HDLC |
|---|---|---|---|---|---|---|
| IP | Ethernet | ✓ | ✓ | | | |
| | FDDI | | ✓ | | | |

TABLE 1-continued

Table 1: Supported Combinations of Protocol-Media-Encapsulations for one embodiment of the invention.

| Protocol | Encap == Media | ARPA | SNAP | SAP | Novell-Ether | HDLC |
|---|---|---|---|---|---|---|
| | Serial | | ✓ | | | |
| | Token Ring | | | | | ✓ |
| IPX | Ethernet | ✓ | ✓ | ✓ | ✓ | |
| | FDDI | | ✓ | | | |
| | Serial | ✓ | ✓ | | | |
| | Token Ring | | | | | ✓ |
| CLNS | Ethernet | | ✓ | | | |
| | FDDI | | ✓ | | | |
| | Serial | | ✓ | | | |
| | Token Ring | | ✓ | | | |
| Decnet | Ethernet | ✓ | | | | |
| | FDDI | | ✓ | | | |
| | Serial | | ✓ | | | |
| | Token Ring | | | | | ✓ |
| XNS | Ethernet | ✓ | | | | |
| | FDDI | | ✓ | | | |
| | Serial | | ✓ | | | |
| | Token Ring | | | | | ✓ |
| AppleTalk | Ethernet | ✓ | ✓ | | | |
| | FDDI | | ✓ | | | |
| | Serial | | ✓ | | | |
| | Token Ring | | | | | ✓ |
| VINES | Ethernet | ✓ | ✓ | | | |
| | FDDI | | ✓ | | | |
| | Serial | ✓ | ✓ | | | |
| | Token Ring | | | | | ✓ |
| TCP | Ethernet | ✓ | ✓ | | | |
| | FDDI | | ✓ | | | |
| | Serial | | ✓ | | | |
| | Token Ring | | | | | ✓ |
| UDP | Ethernet | ✓ | ✓ | | | |
| | FDDI | | ✓ | | | |
| | Serial | | ✓ | | | |
| | Token Ring | | | | | ✓ |
| ICMP | Ethernet | ✓ | ✓ | | | |
| | FDDI | | ✓ | | | |
| | Serial | | ✓ | | | |
| | Token Ring | | | | | ✓ |
| IGMP | Ethernet | ✓ | ✓ | | | |
| | FDDI | | ✓ | | | |
| | Serial | | ✓ | | | |
| | Token Ring | | | | | ✓ |

TABLE 2

Table 2: Definition of media-encapsulation header fields in one embodiment of the invention.

| Media-Encapsulation | Header Field | Controlled parameter for each packet |
|---|---|---|
| Ethernet-ARPA | Destination | Destination MAC address |
| | Protocol | Protocol identification |
| | Source | Source MAC address |
| Ethernet-Novell-Ether | Destination | destination MAC address |
| | Ether-Length | Ethernet 802.3 standard length field |
| | Source | Source MAC address |
| Ethernet-SAP | Control | Control field after DSAP and SSAP |
| | Destination | Destination MAC address field |
| | DSAP | DSAP address field |
| | Ether-Length | Ethernet 802.3 standard length field |
| | Source | Source MAC address field |
| | SSAP | SSAP address field |
| Ethernet-SNAP | Control | Control field after DSAP and SSAP |
| | Destination | Destination MAC address field |
| | DSAP | DSAP address field |
| | Ether-Length | Ethernet 802.3 standard length field |
| | Protocol | Protocol identification field |
| | SNAP-OUI | SNAP header OUI field |
| | Source | Source MAC address field |
| | SSAP | SSAP address field |
| FDDI-SAP | Access-Control | Access-control field |
| | Control | Control field |
| | Destination | Destination MAC address field |
| | DSAP | DSAP address field |
| | Source | Source MAC address field |
| | SSAP | SSAP address field |
| FDDI-SNAP | Access-Control | Access-control field |
| | Control | Control field after DSAP and SSAP |
| | Destination | Destination MAC address field |
| | DSAP | DSAP address field |
| | Protocol | Protocol identification field |
| | SNAP-OUI | SNAP header OUI field |
| | Source | Source MAC address field |
| | SSAP | SSAP address field |
| Serial-HDLC | Flags | HDLC flags |
| | Protocol | HDLC protocol identification |
| Token Ring-SAP | Access-Control | Access-Control fields |
| | Control | Control field after DSAP and SSAP |
| | Destination | Destination MAC address |
| | DSAP | DSAP address field |
| | Frame Control | Token ring frame-control field |
| | RIF | Token Ring routing information field |
| | Source | Source MAC address |
| | SSAP | SSAP address field |
| Token-Ring-SNAP | Access-Control | Access Control field |
| | Control | Control field after DSAP and SSAP |
| | Destination | Destination MAC address field |
| | DSAP | DSAP address field |
| | Frame-Control | Token Ring frame-control field |
| | Protocol | Protocol identification field |
| | RIF | Token Ring Routing Information Field |
| | SNAP-OUI | Snap header OUI field |
| | Source Address | Source MAC address field |
| | SSAP | SSAP address field |

TABLE 3

Table 3 - Protocol header fields for one embodiment of the invention

| Protocol | Header field | Description |
|---|---|---|
| AppleTalk | Checksum | A 16 bit field which is calculated on the DDP header and data. Set to 0X0000 if checksum is not performed |
| | DDP-type | Datagram Delivery Protocol is an 8 bit field that identifies higher level data. |
| | Destination-net | A 16 bit field identifying the network address of a destination station. |
| | Destination-node | An 8 bit field identifying the node address of a destination station |
| | Destination-socket | An 8 bit field which addresses a process on the destination node. |
| | Hop-count | A 4 bit field. Usually, a packet is sent with a hop count of 0 and the field is incremented by each network device through which the packet passes. A packet is dropped by the network device receiving a hop count of 15. In |

TABLE 3-continued

Table 3 - Protocol header fields for one embodiment of the invention

| Protocol | Header field | Description |
|---|---|---|
| | | many embodiments of the invention, the hop count can be set by the user. |
| | Length | A 10 bit field indicating the length of the DDP header and data. |
| | Phase | There are two phases. Phase I supports a single physical network that can have only one network number and be in one zone. Phase II supports multiple logical networks on a single physical network and allows networks to be in more than one zone. |
| | Source node | An 8 bit field indicating the node address of the source station. |
| | Source-network | A 16 bit field indicating the network address of the source station. |
| | Source-Socket | An 8 bit field indicating the process that is sending the packet. |
| CLNS | Checksum | A 16 bit field indicating the checksum on the header. If no checksum is calculated, the checksum field is set to 0X0000. |
| | Destination Address | A 48 bit field indicating the MAC address of the destination station. |
| | Destination Area | A field of variable length indicating the area of the destination station. |
| | Destination Length | An 8 bit field indicating the length of the destination address in number of bytes. Normally the destination address is considered to be a single number. In some embodiments, the destination address is split into area, address and protocol. The destination length covers all three together. |
| | Destination protocol | An 8 bit field indicating the process on the destination station that should receive the packet. |
| | Flags | An 8 bit field which includes the following designations:<br>10000000: SP = Segmentation permitted;<br>01000000: MS = More segments;<br>00100000: E/R = Error Report Requested;<br>00011111: Type = Packet Type<br>00011100: Type = Data Packet<br>00000001: Type = Error Packet |
| | Header Length | An 8 bit field indicating the length of the header in bytes. |
| | Identifier | An 8 bit field indicating the format of the OSI header. The format of the rest of the header is for a data packet. Hello packets have different formats. The designation is as follows:<br>129 is a data packet;<br>130 is an end system hello; and<br>131 is an intermediate system hello. |
| | Lifetime | An 8 bit field indicating the lifetime of a packet in ½ second increments. The field sets how long a packet can exist on the network before it is dropped. |
| | Segment Length | A 16 bit field indicating the length of the header and the data. |
| | Source Address | A 48 bit field indicating the MAC address of the source station. |
| | Source Area | A field of variable length indicating the area of the source station. |
| | Source Length | An 8 bit field indicating the length of the destination address in number of bytes. Normally, the destination address is considered to be a single number. In some embodiments, it is split into area, address and protocol. The length covers all three together. |
| | Source Protocol | An 8 bit field indicating the process on the source station sending the packet. |
| | Version | An 8 bit field indicating the version of the header format. |
| Decnet | Class | An 8 bit field indicating the service class. In most embodiments this field is not used and is kept at 0. |
| | Destination Address | A 48 bit field indicating the MAC address of the destination station. In most embodiments, station area and node are encoded in the destination address. |
| | Destination area | An 8 bit field indicating the destination area. In most embodiments the destination area is encoded in the destination address field and therefore the destination area is not used and kept at 0. |
| | Destination Sub-area | An 8 bit field. In most embodiments, this field is not used and is kept at 0. |
| | Flag | An 8 bit field where the designations have the following meanings regarding the packet:<br>10000000: Padding;<br>01000000: Version;<br>00100000: Intra-Ethernet Packet;<br>00010000: Return Packet;<br>00001000: Do not return to sender;<br>00000110: Packet type-long data packet; and<br>00000001: Control packet. |
| | Length | A 16 bit field indicating the length of the Decnet header plus data. |
| | Next Level | An 8 bit field indicating the next level network device. |
| | Protocol | An 8 bit field indicating the protocol type. In most embodiments, this field is not used and is kept at 0. |
| | Source Address | A 48 bit field indicating the MAC address of the source station. In most embodiments, station area and node are encoded in the MAC address. |
| | Source Area | An 8 bit field indicating the source station area. In most embodiments, this field is not used and is kept at 0. |
| | Source Sub-Area | An 8 bit field indicating the source station sub-area. In most embodiments, this field is not used and is kept at 0. |
| | Visits | An 8 bit field indicating the number of network devices through which the packet has transversed. |
| IP | Checksum | A 16 bit field that is used to ensure the integrity of the IP header. The checksum is the one's complement arithmetic of the IP header as a sequence of 16-bit integers and does not include the IP data. |
| | Destination | A 32 bit field indicating the destination address. |
| | Fragmentation | A 16 bit field having the following meanings:<br>0x4000 - Don't Fragment;<br>0x2000 - More Fragments; and<br>0x1FFF - Fragment Offset, indicating the start of this fragment in the original IP header. |
| | Header length | A 4 bit field indicating the length of the IP header in numbers of 32 bit words. A typical IP header is 20 bytes long and therefore the header length will be 5. |
| | Identification | A 16 bit field indicating a unique identifier for each packet in case of fragmentation. |
| | Length | A 16 bit field indicating the total length including IP header and data. |
| | Option | A variable length of up to 40 bytes, often used to record routes or timestamps. |

TABLE 3-continued

Table 3 - Protocol header fields for one embodiment of the invention

| Protocol | Header field | Description |
| --- | --- | --- |
|  | Protocol | An 8 bit field which identifies the higher level data. A few common higher level protocols include:<br>1 - ICMP;<br>2 - IGMP;<br>6 - TCP;<br>8 - EGP;<br>9 - IGRP;<br>17 - UDP;<br>88 - EIGRP; and<br>89 - OSPF. |
|  | Source | A 32 bit field indicating the IP address of the packet sender. |
|  | TOS | An 8 bit field indicating the Type of Service.<br>Types of service include:<br>11100000 - Precedence (importance of packet);<br>00010000 - low delay;<br>00001000 - high throughput;<br>00000100 - high reliability; and<br>00000011 - unused. |
|  | TTL | An 8 bit field indicating the time to live of the packet. This field specifies how long, in seconds, the packet is allowed to live on the network. Each network device either decrements this field by 1 or by the number of seconds it holds the packet. A packet is discarded if this field reaches 0. |
|  | Version | A 4 bit field indication the version number of the IP protocol. Current IP protocol version is 4. |
| IPX | Checksum | An optional field usually set to 0xFFFF. |
|  | Destination Address | A 48 bit field indicating the MAC address of the destination station. |
|  | Destination Network | A 32 bit field indicating which network hosts the destination station. |
|  | Destination Socket | A 16 bit field which specifies processes within the destination station:<br>0x0001 - Routing Information Packet;<br>0x0002 - Echo Protocol Packet;<br>0x0003 - Error Handler Packet;<br>0x0451 - File Service Packet;<br>0x0452 - Service Advertising Packet;<br>0x0453 - Routing Information Packet;<br>0x0455 - NetBIOS Packet; and<br>0x0456 - Diagnostic Packet. |
|  | Length | A 16 bit field indicating the length of the IPX header and data. |
|  | Packet Type | An 8 bit field that defines the higher level data:<br>0 - unknown packet type;<br>1 - RIP (routing information protocol);<br>2 - Echo Packet;<br>3 - Error Packet;<br>4 - Packet Exchange Protocol (PEP);<br>5 - Sequenced Packet Protocol (SPP);<br>17 - Netware Core Protocol (NCP). |
|  | Source Address | A 48 bit field indicating the MAC address of the source station. |
|  | Source Network | A 32 bit field indicating which network hosts the source station. |
|  | Source Socket | A 16 bit field indicating the process sending the packet (see Destination Socket for values). |
|  | Transport control | An 8 bit field indicating control of the transport:<br>11110000 - reserved; and<br>00001111 - Hop count.<br>If set for hop count, typically packets are sent with hop count of 0 and the field is incremented by each network device. The packet is dropped when the hop count reaches 15. |
| VINES | Checksum | A 16 bit field which is optional and usually set to 0xFFFF. |
|  | Destination Network | A 32 bit field which indicates which network the destination station is on. |
|  | Destination Sub-Network | A 16 bit field indicating the address assigned to the destination station. |
|  | Length | A 16 bit field indicating the length of the VINES header and data. |
|  | Packet Type | An 8 bit field indicating higher level data:<br>0 - unknown packet type;<br>1 - RIP (routing information packet);<br>2 - Echo Packet;<br>3 - Error Packet;<br>4 - Packet Exchange Protocol (PEP); and<br>5 - Sequenced Packet Protocol (SPP). |
|  | Source Network | A 32 bit field indicating which network hosts the source station. |
|  | Source Sub-Network | A 16 bit field indicating the address assigned to the source station. |
|  | Transport Control | An 8 bit field indicating transport control. 11110000 is reserved. 00001111 indicates hop count. Packets are typically sent with a hop count of 0. The transport control field is incremented by each network device through which the packet traverses. A network device will drop a received packet if the hop count is 15. |
| XNS | Checksum | A 16 bit field which is optional. Usually set to 0xFFFF. |
|  | Destination Address | A 48 bit field indicating the MAC address of the destination station. |
|  | Destination Network | A 32 bit field indicating which network hosts the destination station. |
|  | Destination Socket | A 16 bit field that specifies a process within the destination station. For example, 0x0001 indicates a routing information packet; 0x0002 indicates a Echo Protocol Packet; and 0x0003 indicates an error handler packet. |
|  | Length | A 16 bit field indicating the length of the XNS header and data. |
|  | Packet Type | An 8 bit field indicating higher level data:<br>0 - unknown packet type;<br>1 - RIP (routing information packet);<br>2 - Echo Packet;<br>3 - Error Packet;<br>4 - Packet Exchange Protocol (PEP); and<br>5 - Sequence Packet Protocol (SPP). |
|  | Source Address | A 48 bit field indicating the MAC address of the source station. |
|  | Source Network | A 32 bit field indicating which network hosts the source station. |
|  | Source Socket | A 16 bit field indicating which process is sending the packet (see Destination Socket). |
|  | Transport Control | An 8 bit field where 11110000 is reserved and 00001111 indicates hop count. Usually, packets are sent with a hop count of 0. The field is incremented by each network device and the packet is dropped by the network device receiving the packet with the hop count of 15. |
| ICMP | Type | An 8 bit field that identifies the ICMP message:<br>0 - Echo Replay;<br>3 - Destination Unreachable;<br>4 - Source Quench;<br>5 - Redirect;<br>8 - Echo Request; |

TABLE 3-continued

Table 3 - Protocol header fields for one embodiment of the invention

| Protocol | Header field | Description |
|---|---|---|
| | | 11 - Time Exceeded for a packet;<br>12 - parameter problem on a packet;<br>13 - TimeStamp Request;<br>14 - TimeStamp Replay;<br>17 - Address Mask Request; and<br>18 - Address Mask Reply. |
| | Code | An 8 bit field giving further information on the ICMP message:<br>0 - Network Unreachable;<br>1 - Host Unreachable;<br>2 - Protocol Unreachable;<br>3 - Port Unreachable;<br>4 - Fragmentation Needed and DF set;<br>5 - Source Route Field;<br>6 - Destination network unknown;<br>7 - Destination host unknown;<br>8 - Source host isolated;<br>9 - Communication with destination administratively prohibited;<br>10 - Communication with destination host administratively prohibited;<br>11 - Network unreachable for type of service; and<br>12 - host unreachable for type of service. |
| | Checksum | A 16 bit field, which is the one's complement checksum calculated on the ICMP header and the ICMP data. |
| IGMP | Version | A 4 bit field indicating the IGMP version. The current version is 1. |
| | Type | A 4 bit field indicating the type of message:<br>1 - Query; and<br>2 - Response. |
| | Unused | An 8 bit field which is unused and should be set to 0. |
| | Checksum | A 16 bit field holding a checksum calculated on the IGMP header and the IGMP data. |
| | Group Address | A 32 bit field used by hosts to report membership to a particular multicast group. |
| TCP | Source Port | A 16 bit field that identifies the application program at the source. |
| | Destination Port | A 16 bit field that identifies the application program at the destination. |
| | Sequence Number | A 32 bit field that identifies the position in the sender's byte stream of the data in this segment. |
| | Acknowledge Number | A 32 bit field that identifies the number of the octet that the source expects to receive next. |
| | Header Length | The first 4 bits of an 8 bit field that indicates the length of the TCP header in numbers of 32 bit words. |
| | Flags | An 8 bit field indicating status:<br>00100000 - URG Urgent pointer field is valid;<br>00010000 - ACK Acknowledge field is valid;<br>00001000 - PSH This segment requests a push;<br>00000100 - RST Reset the connection;<br>00000010 - SYN Synchronize sequence numbers; and<br>00000001 - FIN Sender has reached end of its byte stream. |
| | Window | A 16 bit field in which the sender advertises how much data it is willing to accept into its buffer. |
| | Checksum | A 16 bit field which is the one's complement checksum calculated on the TCP header, TECP data and IP pseudo header (Source IP address, Destination IP address, Protocol and Length). |
| | Urgent | A 16 bit field which, if URG bit is set, points to urgent, or out-of-band information in the byte stream. |
| | Optional | Variable length, optional field. |
| UDP | Source Port | A 16 bit field that identifies the application program at the source. |
| | Destination Port | A 16 bit field that identifies the application program at the destination. |
| | Length | A 16 bit field indicating the total UDP length, including the UDP header and data. |
| | Checksum | A 16 bit field which is the one's complement checksum calculated on the UDP header, UDP data and IP pseudo header (Source IP address, Destination IP address, Protocol and Length). |

We claim:

1. A network verification tool (NVT) apparatus, comprising:
a network under test;
a plurality of probe network devices coupled to the network under test, each one probe network device configured to host at least one associated task type; and
an NVT server coupled to the plurality of probe network devices, wherein
the NVT server is configured to translate parameters for a plurality of tasks entered by a user to instructions executable by the plurality of probe network devices, wherein
each task of the plurality of tasks has a corresponding task type,
a first task subset of the plurality of tasks comprises parameters for tasks to configure the network under test to emulate a network having a greater number of network devices than the number of network devices comprising the network under test,
a second task subset of the plurality of tasks comprises parameters for tasks to configure corresponding probe network devices to analyze conditions of the emulated network, and
a profile comprises the first and second task subsets,
the NVT server is configured to transmit the profile to the network under test by further being configured to transmit the instructions to each probe network device hosting the associated task type, and
each probe network device is configured to execute a process corresponding to the at least one associated task type in response to the instructions.

2. The apparatus of claim 1 further comprising:
an NVT client coupled to the NVT server, wherein
the NVT client is configured to provide a template to the user for entering the parameters, and
the NVT client is configured to transmit the parameters to the NVT server.

3. The apparatus of claim 2 wherein the NVT server is configured to transmit a collection of templates to the NVT client, wherein
the collection of templates comprises a corresponding template for each of the at least one task types, and further comprises the template.

4. The apparatus of claim 1, wherein the NVT server is coupled through an Ethernet control network and a communication server to the at least one probe network device.

5. The apparatus of claim 1, wherein the at least one task type includes at least one of a traffic generator, a traffic analyzer, a large network emulator, a session emulator, a device query or a script task type.

6. The apparatus of claim 5, wherein the traffic generator is compatible with at least one combination of a protocol, a media and an encapsulation, wherein
- the protocol is selected from the group consisting of IP, IPX, CLNS, Decnet, XNS, AppleTalk, VINES, TCP, UDP, ICMP, and IGMP;
- the media is selected from the group consisting of Ethernet, FDDI, Serial and Token Ring; and
- the encapsulation is selected from the group consisting of ARPA, SNAP, SAP, Novell-Ether and HDLC.

7. The apparatus of claim 5, wherein the session emulator task type is selected from the group consisting of a multi-protocol session emulator, a LLC2 single protocol session emulator, and a SDLC single protocol session emulator.

8. The apparatus of claim 5, wherein the large network emulator task type is selected from the group consisting of a BGP large network emulator, a EIGRP large network emulator, an IP RIP large network emulator, an IPX RIP large network emulator and an OSPF large network emulator.

9. The apparatus of claim 5, wherein the device query task type is selected from the group consisting of a query CPU, a query memory, a query IP route, a query BGP task, a query EIGRP task, a query OSPF task, a query multi-protocol session task, a query LLC2 single-protocol session task, a query SDLC single-protocol session task, and a query traffic analyzer task.

10. A method of testing a network, comprising:
- providing a test network comprising a plurality of probe network devices each hosting a corresponding task type and further comprising a network under test coupled to the probe network devices;
- providing a NVT server coupled to the probe network devices;
- entering the parameters for a plurality of tasks into corresponding templates, wherein
  - each of the plurality of tasks has a corresponding task type,
  - a first task subset of the plurality of tasks comprises parameters for tasks to configure the network under test to emulate a network having a greater number of network devices than the number of network devices comprising the network under test,
  - a second task subset of the plurality of tasks comprises parameters for tasks to configure corresponding probe network devices to analyze conditions of the emulated network, and
  - a profile comprises the first and second task subsets;
- translating the parameters into instructions executable by the probe network device corresponding to the associated task type, wherein
  - said translating is performed using the NVT server;
- transferring the instructions to each probe network device corresponding to the associated tasks;
- executing the profile in the network under test by executing the task types associated with the instructions on each probe network device corresponding to the associated tasks in order to form a process on the probe network device; and
- monitoring the network under test in order to determine performance, wherein
  - said monitoring is performed using the processes on the probe network devices associated with the second task subset.

11. The method of claim 10, wherein entering the parameters for a task of the task type includes
- coupling an NVT client to the NVT server,
- transmitting a collection of templates corresponding to the task type to the NVT client,
- entering parameters into at least one of the collection of templates to form the task, and
- transmitting the task to the NVT server.

12. The method of claim 10, wherein the task type includes at least one of a traffic generator, a traffic analyzer, a large network emulator, a session emulator, a device query or a script task type.

13. The method of claim 12, wherein the traffic generator is compatible with at least one combination of a protocol, a media and an encapsulation, wherein
- the protocol is selected from the group consisting of IP, IPX, CLNS, Decnet, XNS, AppleTalk, VINES, TCP, UDP, ICMP, and IGMP;
- the media is selected from the group consisting of Ethernet, FDDI, Serial and Token Ring; and
- the encapsulation is selected from the group consisting of ARPA, SNAP, SAP, Novell-Ether and HDLC.

14. The method of claim 12, wherein the session emulator task type is selected from the group consisting of a multi-protocol session emulator, a LLC2 single protocol session emulator, and a SDLC single protocol session emulator.

15. The method of claim 12, wherein the large network emulator task type is selected from the group consisting of a BGP large network emulator, a EIGRP large network emulator, an IP RIP large network emulator, an IPX RIP large network emulator and an OSPF large network emulator.

16. The method of claim 12, wherein the device query task type is selected from the group consisting of a query CPU, a query memory, a query IP route, a query BOP task, a query EIGRP task, a query OSPF task, a query multi-protocol session task, a query LLC2 single-protocol session task, a query SDLC single-protocol session task, and a query traffic analyzer task.

17. The method of claim 12, wherein the NVT client and the NVT server are coupled through the Internet and the collection of templates and the task are transmitted using JAVA/HTML processes.

18. A network testing method performed on a test network having at least one network device coupled to an NVT server, the method comprising:
- forming a profile comprising a plurality of tasks, the plurality of tasks further comprising a first task subset and a second task subset;
- forming each task, each task being formed by entering task parameters into a corresponding task template, wherein
  - the first task subset comprises parameters for tasks to configure a network under test to emulate a network having a greater number of network devices than the number of network devices comprising the network under test, and
  - the second task subset comprises parameters for tasks to configure corresponding probe network devices to analyze conditions of the emulated network; and
- translating the task parameters using the NVT server to form executable instructions for a plurality of probe network devices, each corresponding to a task of the plurality of tasks, and hosting a corresponding task code, wherein the task codes execute the executable instructions; and transferring the executable instructions to each corresponding probe network device, wherein the corresponding probe network device executes the executable instructions using the task code hosted on the probe network device.

19. The method of claim 18, wherein the task is selected from a group of tasks consisting of a traffic generator, a traffic analyzer, a large network emulator, a session emulator, a device query or a script task.

20. A network verification test apparatus comprising:

an NVT server processor; and a memo coupled to the NVT server processor, wherein the memory stores instructions, executable on the NVT server processor, for forming a profile comprising a plurality of tasks, the plurality of tasks further comprising a first task subset and a second task subset, wherein said forming the profile comprises:

sending task templates to a user, wherein each task template corresponds to a task of the plurality of tasks;

receiving tasks formed by the user entering parameters into the task templates, wherein the first task subset comprises parameters for tasks to configure a network under test to emulate a network having a greater number of network devices than the number of network devices comprising the network under test, and the second task subset comprises parameters for tasks to configure corresponding probe network devices to analyze conditions of the emulated network;

translating the tasks to task code configured to be executed by one or more probe network devices; and transmitting the task code to the one or more probe network devices.

21. The apparatus of claim 20, wherein the task templates correspond to task types, the task types chosen from a group consisting of a traffic generator, a traffic analyzer, a large network emulator, a session emulator, a device query or a script task.

* * * * *